(12) United States Patent  
Oohashi et al.

(10) Patent No.: US 6,740,995 B2  
(45) Date of Patent: May 25, 2004

(54) AUTOMOTIVE ALTERNATOR

(75) Inventors: Atsushi Oohashi, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/881,090

(22) Filed: Jun. 15, 2001

(65) Prior Publication Data

US 2002/0050750 A1 May 2, 2002

(30) Foreign Application Priority Data

Oct. 30, 2000  (JP) ........................................ 2000-330846

(51) Int. Cl.⁷ ................................................ H02K 9/00
(52) U.S. Cl. ...................................... 310/68 D; 310/58
(58) Field of Search .................. 310/68 D, 58, 310/64

(56) References Cited

U.S. PATENT DOCUMENTS

| | | | |
|---|---|---|---|
| 3,586,892 A | | 6/1971 | Suguru |
| 4,293,788 A | * | 10/1981 | Binder ........................ 310/227 |
| 4,604,538 A | * | 8/1986 | Merrill et al. ............. 310/68 D |
| 4,606,000 A | * | 8/1986 | Steele et al. ................. 363/145 |
| 4,794,285 A | * | 12/1988 | Nimura et al. ............. 310/68 D |
| 4,890,050 A | * | 12/1989 | Mackevich .................. 310/184 |
| 5,345,132 A | | 9/1994 | Sasaki et al. |
| 5,543,703 A | * | 8/1996 | Kusase et al. .............. 180/65.4 |
| 5,729,063 A | * | 3/1998 | Adachi et al. ................. 310/64 |
| 6,060,802 A | | 5/2000 | Masegi et al. |
| 6,081,054 A | * | 6/2000 | Kashihara et al. ............. 310/58 |
| 6,140,722 A | * | 10/2000 | Ballard et al. ............ 310/68 D |
| 6,252,320 B1 | * | 6/2001 | Ballard et al. ............ 310/68 D |
| 6,291,913 B1 | * | 9/2001 | Nikawa et al. ........... 310/68 R |

FOREIGN PATENT DOCUMENTS

| | | |
|---|---|---|
| EP | 0 300 063 B | 1/1989 |
| JP | 2000-166178 | 6/2000 |

* cited by examiner

*Primary Examiner*—Joseph Waks  
(74) *Attorney, Agent, or Firm*—Sughrue Mion, PLLC

(57) ABSTRACT

An automotive alternator is provided wherein surface area of a heat dissipating plate of a rectifier is enlarged, cooling characteristics of the rectifier and brush are improved, and performance and durability may be improved. The automotive alternator including a case 3 having a plurality of intake holes E, G and provided with a rotor 6, a stator 8, a rectifier 12, a regulator 14, a brush 10 and a connector 22, cooling air drawn in from intake holes E, G by operation of a fan cooling the rectifier 12 and further ventilating coil ends 19, wherein, the regulator 14 and the brush 10 are disposed so as to overlap in an axial direction, and center lines of the regulator 14, the brush 10, and the connector 22 are disposed on an approximately same plane extending in a radial direction, the rectifier 12 is disposed approximately line symmetrical to the same plane, and the plurality of intake holes E, G are formed in the case 3 at a position corresponding to the rectifier 12.

6 Claims, 25 Drawing Sheets

AUTOMOTIVE ALTERNATOR

BACKGROUND OF THE INVENTION

1. Field of the Invention

The present invention relates to an automotive alternator mounted to, for example, an automotive vehicle, and, in particular, to an automotive alternator mounting a brush, rectifier and regulator.

2. Description of the Related Art

FIG. 19 is a cross section showing a conventional automotive alternator for use in an automobile. FIG. 20 is a perspective view of the conventional alternator. The conventional automotive alternator shown in the figures includes, a case 3 constructed from an aluminum front bracket 1 and rear bracket 2, a shaft 5 with a pulley 4 fixed on one end thereof provided inside the case 3, a claw-pole rotor 6 fixed to the shaft 5, fans 7a, 7b fixed on respective axial end surfaces of the rotor 6, a stator core 17 fixed inside the case 3, a stator coil 18 received in slots of the stator core 17, a stator 8 constructed from the stator core 17 and the stator coil 18, a slip-ring 9 fixed on the other end of the shaft 5 for supplying electric current to the rotor 6, a pair of brushes 10 for slidingly contacting the slip-ring 9, a brush holder 11 for receiving the brushes 10, a rectifier 12 electrically connected to the stator coil 18 for rectifying an alternating current (ac) produced in the stator coil 18 into a direct current (dc), a heat sink 13 fitted to the brush holder 11, and a regulator 14 attached to the heat sink 13 for adjusting the alternating voltage produced in the stator coil 18.

A connector 22 for insertion in an external plug (not shown) is disposed in the vicinity of the regulator 14. A regulator assembly 30 includes the regulator 14, brush holder 11 and connector 22.

The rotor 6 includes a rotor coil 15 for flowing an electric current to generate magnetic flux and a pole core 16 which houses the rotor coil 15 and forms magnetic poles in accordance with a magnetic flux. The fans 7a, 7b for cooling are provided on respective axial end surfaces of the pole core 16.

The stator 8 includes the stator core 17, through which passes a rotating magnetic field in accordance with the rotor 6, and the stator coil 18 which flows an alternating current output in accordance with the rotating magnetic field, and the stator coil 18 forms coil ends 19 at both axial ends of the stator core 17.

FIG. 21 is a perspective view of the regulator assembly 30. Moreover, FIG. 22 is a drawing showing front, top and side views of the regulator assembly 30. In the conventional regulator assembly 30, the regulator 14 and brush holder 11 are disposed so as to overlap in an axial direction of the shaft 5. The connector 22 is disposed relative to the regulator 14 and brush holder 11 at a location on a plane including the regulator 14 and brush holder 11 and orthogonally intersecting the shaft 5 and rotated a predetermined angle in a circumferential direction, and such that an opening thereof faces toward the outside. Ventilating holes 30a are provided at both sides of the brush holder 11.

FIG. 23 is a perspective view of the rectifier assembly 31 in which a rectifier 12 is assembled with a circuit board 29. Furthermore, FIG. 24 is a front view of a conventional rear bracket assembly. FIG. 25 is a cross section taken along the line C—C shown by the arrows in FIG. 24. In the figures, the rectifier 12 includes diodes 20 mounted on an approximately C-shaped heat sink 21, and the rectifier 12 is assembled with a similarly roughly C-shaped circuit board 29 to give the rectifier assembly 31. The rectifier assembly 31 is assembled to the rear bracket 2 such that the circuit board 29 is positioned at the middle of the dynamo-electric generator (alternator). Further, the rectifier assembly 31 is secured by bolts 28 as a fixing means. In this case, since the rectifier assembly 31 makes a approximate C-shape, it is possible to have a space in a C-shaped opening. Next, the regulator assembly 30 is inserted and assembled in this space and, as shown in FIGS. 24 and 25, the rear bracket assembly is assembled. Moreover, an angle between the two bolts 28, being a standard governing the size of the plate-shaped heat dissipating heat sink 21, is 210 degrees.

FIG. 26 is a front view of a conventional rear bracket. FIG. 27 is a drawing of a conventional alternator viewed from a rear side thereof. A plurality of openings E (intake holes) formed in the rear bracket are opened at locations corresponding to the roughly C-shaped rectifier assembly 31. Moreover, an opening G (intake hole) is opened at a location corresponding to the regulator assembly 30.

In an automotive alternator constructed as above, as shown in FIG. 19, cooling air flows into the case 3 from the openings E of the case 3 in accordance with rotation of the fan 7b which rotates together with rotation of the rotor 6. This cooling air flows as shown by the arrow a and cools the heat sink 21 and diodes 20. Then, this cooling air is flowed in an outside radial direction (centrifugal direction) by the fan 7b and is discharged to the outside from an opening F. Moreover, cooling air also flows into the case 3 in accordance with rotation of the fan 7b from an opening G and this cooling air flows as shown by the arrow β and cools the heat sink 13 and power transistors of the regulator 14. Then, this cooling air is flowed in an outside radial direction by the fan 7b and is discharged to the outside from an opening H.

An S terminal, so-called because it relates to sensing, and an L terminal, so-called because it relates to a lamp, are provided in the connector 22 and these terminals are connected to various portions in an automotive vehicle via an external plug (not shown). The S terminal is used to monitor battery voltage and the L terminal is used to flow an initial exciting current and for lighting a lamp (not shown) when there is a generating abnormality such as an over generation, over discharge and the like.

In a conventional automotive alternator constructed as above, the regulator assembly 30 is disposed in the empty space of the C-shaped opening portion of the approximately C-shaped rectifier assembly 31. Namely, the rectifier assembly 31 and regulator assembly 30 are provided in a same plane orthogonally intersecting the shaft 5. Thus, the size of the heat sink 21 of the rectifier 12 is limited by the regulator assembly 30. However, if the size of the heat sink 21 of the rectifier 12 is increased, cooling characteristics of the rectifier 12 are improved and durability may also be increased along with the increase in performance. Also, the connector 22 is disposed, relative to the regulator 14 fixed to the heat sink and the brush holder, in the same plane orthogonally intersecting the shaft 5 and adjacent in a circumferential direction. Since there is a difference in ventilating resistance between the portions where the heat sink and connector 22 are disposed, the rectifying characteristics of the cooling air ventilating the regulator assembly 30 are obstructed. Consequently, the cooling characteristics of the entire rear bracket assembly, including the rectifier 12, are degraded. Moreover, wind noise increases due to a ventilating unbalance at the intake side.

SUMMARY OF THE INVENTION

The present invention aims to solve the above problems with the conventional art and an object of the present invention is to provide an automotive alternator in which a ventilating resistance unbalance is improved, surface area of a heat dissipating plate of a rectifier is enlarged to improved cooling characteristics of the rectifier and reduce noise, performance is high, and durability and quality are high.

In order to achieve the above object, according to one aspect of the present invention, there is provided an automotive alternator comprising:

a shaft supported in a case so as to be capable of rotating;

a rotor housed in the case and comprising a plurality of magnetic poles fixed to the shaft, a field winding, and fans fixed to at least one axial end of the magnetic poles; a stator fixed to the case so as to be positioned at an outer circumference of the rotor and comprising a core and a winding wound in the core, and provided with coil ends formed by bending back the winding at ends of the core;

a rectifier disposed in the case and comprising a rectifying element for rectifying an ac generated by the stator to a dc and a heat dissipating plate for dissipating heat generated by the rectifying element;

a regulator disposed in the case for adjusting a magnitude of the ac voltage generated by the stator;

a brush disposed in the case so as to advance and retreat in a radial direction of the rotor and one end thereof contacting the rotor to supply a field current to the field winding of the rotor;

a connector for mounting an external plug; and the case containing a plurality of intake holes at a side where the fan of the rotor is mounted, and cooling air drawn in from the intake holes is bent in a centrifugal direction after cooling the rectifier to ventilate and cool the coil ends; wherein, the regulator and the brush are disposed so as to overlap in an axial direction, and center lines of the regulator, the brush, and the connector are disposed on an approximately same plane extending in a radial direction, the rectifier is disposed approximately line symmetrical to the same plane, and the plurality of intake holes are formed in the case at a position corresponding to the rectifier.

According to another aspect of the present invention there is provided an automotive alternator wherein:

the regulator and the brush are disposed approximately point symmetrical with the connector with the shaft as a center, and center lines of the regulator, brush and connector are disposed on an approximately same plane extending in a radial direction.

According to yet another aspect of the present invention there is provided an automotive alternator wherein:

the connector is disposed at an approximately outer circumferential-side of the regulator and the brush, and center lines of the connector, the regulator and the brush are disposed on an approximately same plane extending in a radial direction.

According to still yet another aspect of the present invention there is provided an automotive alternator wherein:

the regulator and the brush are disposed so as to overlap in an axial direction, the connector is disposed so as to further overlap the regulator and the brush in an axial direction, and center lines of the regulator, the brush and the connector are disposed on an approximately same plane extending in a radial direction.

According to still yet another aspect of the present invention there is provided an automotive alternator wherein:

a fixing means for fixing to the case is used for both the regulator and the rectifier.

According to still yet another aspect of the present invention there is provided an automotive alternator wherein:

the coil end does not substantially lap the fan in an axial direction and the cooling air produced by the fan ventilates an end portion of the coil end.

According to still yet another aspect of the present invention there is provided an automotive alternator wherein:

the coil end substantially laps the fan in an axial direction and the cooling air produced by the fan passes through and ventilates an interior of the coil end.

DETAILED DESCRIPTION OF THE PREFERRED EMBODIMENTS

Embodiment 1

Figure 1:
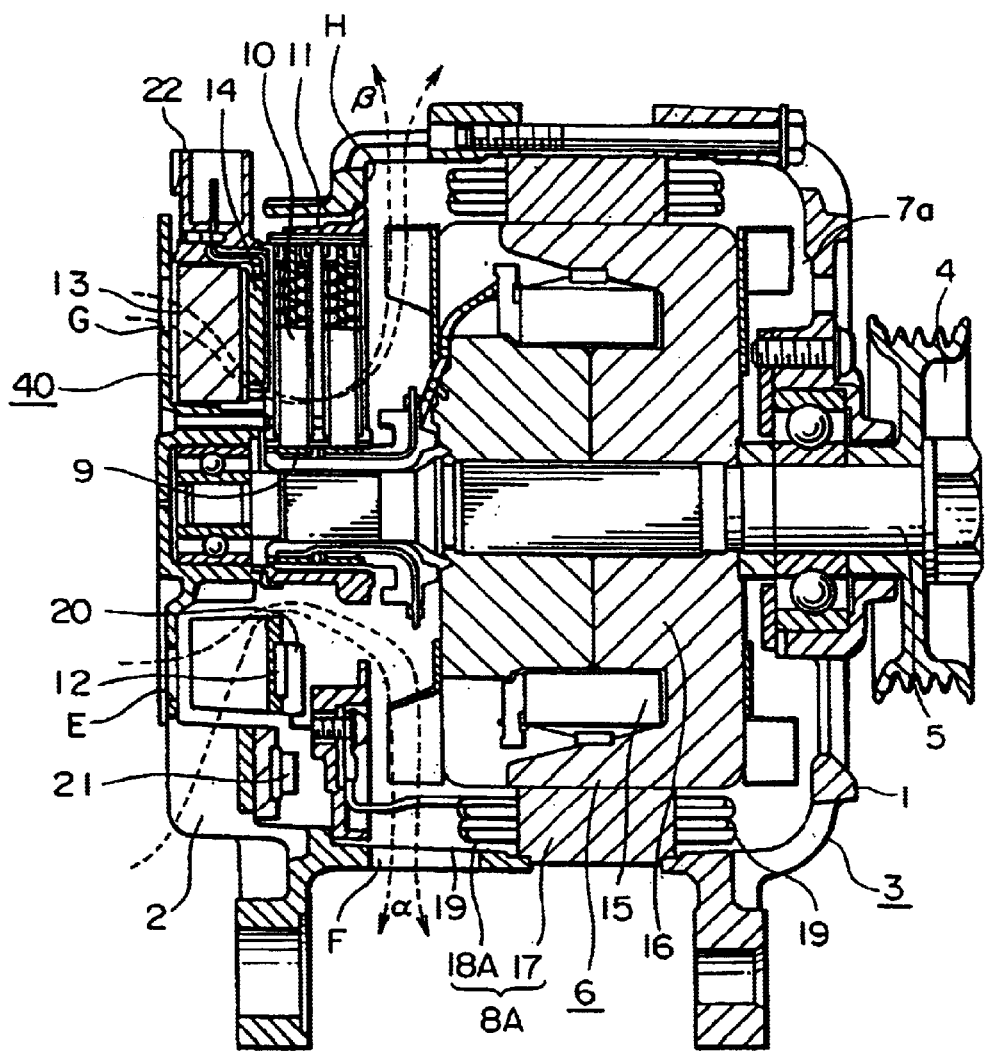
FIG. 1 is a cross section showing an automotive alternator according to Embodiment 1 of the present invention.

FIG. 1 is a cross section showing an automotive alternator of the present invention. This automotive alternator includes, a case 3 constructed from an aluminum front bracket 1 and rear bracket 2, a shaft 5 with a pulley 4 fixed on one end thereof provided inside the case 3, a claw-pole rotor 6 fixed to the shaft 5, fans 7a, 7b fixed on respective axial end surfaces of the rotor 6, a stator core 17 fixed inside the case 3, a stator coil 18A received in slots of the stator core 17, a stator 8A constructed from the stator core 17 and the stator coil 18A, a slip-ring 9 fixed on the other end of the shaft 5 for supplying electric current to the rotor 6, a pair of brushes 10 for slidingly contacting the slip-ring 9, a brush holder 11 for receiving the brushes 10, a rectifier 12 electrically connected to the stator coil 18A for rectifying an alternating current produced in the stator coil 18A into a direct current, a heat sink 13 fitted to the brush holder 11, and a regulator 14 attached to the heat sink 13 for adjusting the alternating voltage produced in the stator coil 18A.

A connector 22 for insertion in an external plug (not shown) is disposed in the vicinity of the regulator 14. A regulator assembly 40 includes the regulator 14, brush holder 11 and connector 22.

The rotor 6 includes a rotor coil 15 for flowing an electric current to generate magnetic flux and a pole core 16 which houses the rotor coil 15 and forms magnetic poles in accordance with magnetic flux. The fans 7a, 7b for cooling are provided on respective axial end surfaces of the pole core 16.

The stator 8A includes the stator core 17, through which passes a rotating magnetic field in accordance with the rotor 6, and the stator coil 18A which flows an alternating current output in accordance with the rotating magnetic field, and the stator coil 18A forms coil ends 19 at both axial ends of the stator core 17.

Figure 2:
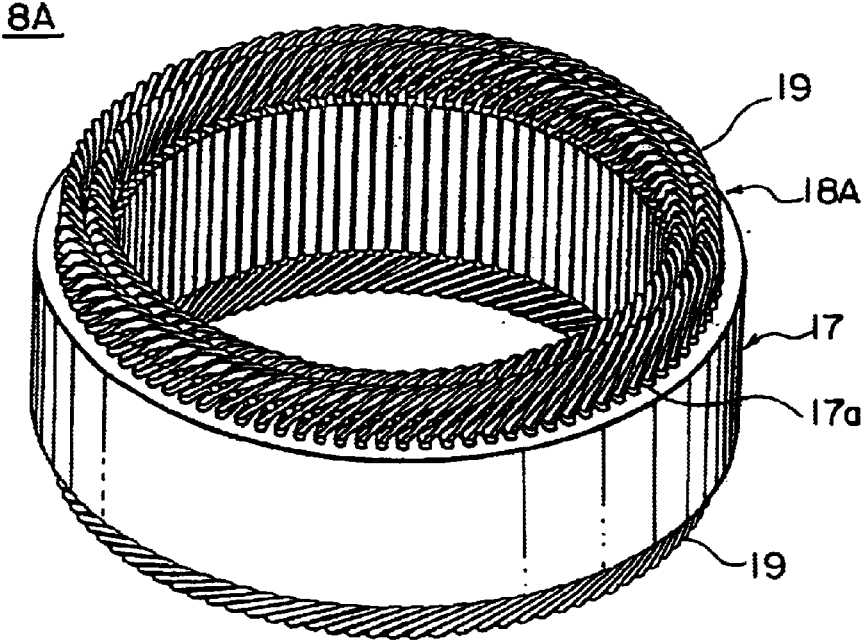
FIG. 2 is a perspective view of a stator of the dynamo-electric generator (alternator) according to Embodiment 1 of the present invention.
Figure 3:
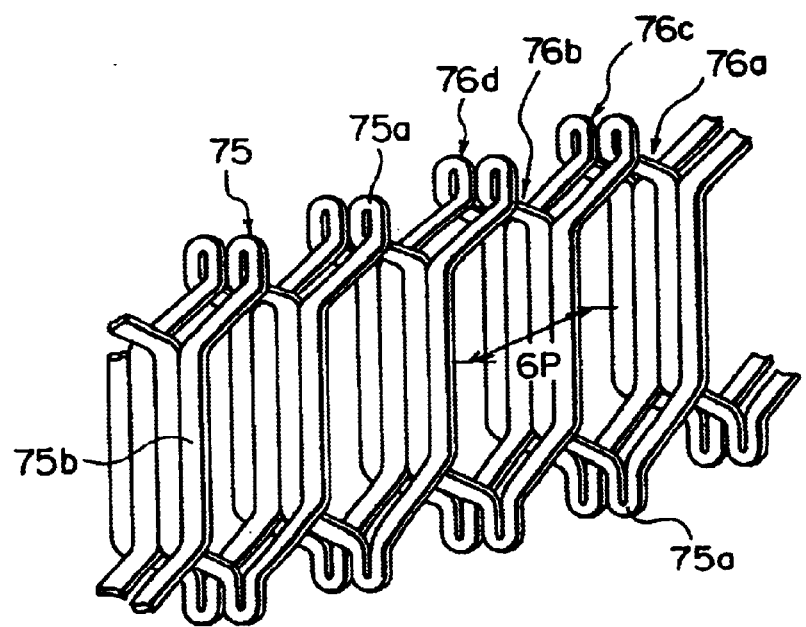
FIG. 3 is a perspective view showing an essential portion of one phase of a stator winding according to Embodiment 1 of the present invention.

Here, the construction of the stator 8A will be described with reference to FIGS. 2 and 3. Moreover, FIG. 3 shows an essential portion of one phase of a stator winding.

The stator 8A includes the cylindrical stator core 17 formed with a number of slots 17a extending in an axial direction at a predetermined pitch in a circumferential direction, and the stator coil 18A in which conductor wire is bent back outside the slots at end surfaces of the stator core 17 and wound so as to alternately occupy an inner layer and an outer layer within the slots at an interval of six (6) slots.

Insulation coated copper connecting wire 75 is employed in the conductor wire comprising the stator coil 18A. Also, ninety-six (96) slots 17a are provided in the stator core 17.

In each slot group comprising slots 17a lined-up at a pitch of six (6P) slots are wound: a first winding sub-portion 76a formed by wave winding a copper connecting wire 75 into the stator core 17 in every sixth slot 17a so as to alternately occupy a third position and a fourth position; a second winding sub-portion 76b formed by wave winding a copper connecting wire 75 into the stator core 17 in every sixth slot 17a so as to alternately occupy the fourth position and the third position; a third winding sub-portion 76c formed by wave winding a copper connecting wire 75 into the stator core 17 in every sixth slot 17a so as to alternately occupy a first position and a second position; a fourth winding sub-portion 76d formed by wave winding a copper connecting wire 75 into the stator core 17 in every sixth slot 17a so as to alternately occupy the second position and the first position. Here, each first to fourth winding sub-portion 76a to 76d is one turn of winding, and the second winding sub-portion 76b is wound at electrical angle which is 180 degrees opposite the first winding sub-portion 76a and the fourth winding sub-portion 76d is wound at electrical angle which is 180 degrees opposite the third winding sub-portion 76c. Moreover, slot insertion portions 75b of the copper connecting wires 75 are arranged so as to line up in a row of four strands within each slot 17a in a radial direction.

The first to fourth winding sub-portions 76a to 76d wound in each of the slot groups are connected in series to form one phase of the stator winding having four turns. In other words, a six phase stator winding is constructed because there are six (6) slot groups comprising slots 17a at an interval of every respective sixth slot. Moreover, three phases of stator winding are AC wire bound to construct a three-phase stator line winding. Thus, the stator coil 18A constructed from two (2) sets of three-phase stator line windings is wound in the stator core 17 to obtain the stator 8A.

In the stator coil 18A constructed as above, turn portions 75a (coil ends) of the copper connecting wires 75, which are bent back outside the slots at end surfaces of the stator core 17, line-up in two (2) rows in a radial direction and are arranged into rows in a circumferential direction to comprise front and rear coil ends 19.

In the present embodiment, each turn portion 75a of the first and second winding sub-portions 76a, 76b extends from the third position of the respective slot 17a at the rear side and is bent back outside the slot and led into the fourth position of the slot 17a six (6) slots away. Similarly, each turn portion 75a of the third and fourth winding sub-portions 76c, 76d extends from the first position of the respective slot 17a at the rear side and is bent back outside the slot and led into the second position of the slot 17a six (6) slots away. That is, each turn portion 75a is formed in an approximately similar shape. Coil ends 19 are arranged such that turn portions 75a line-up in two (2) rows in a radial direction and in rows in a circumferential direction.

Figure 4:
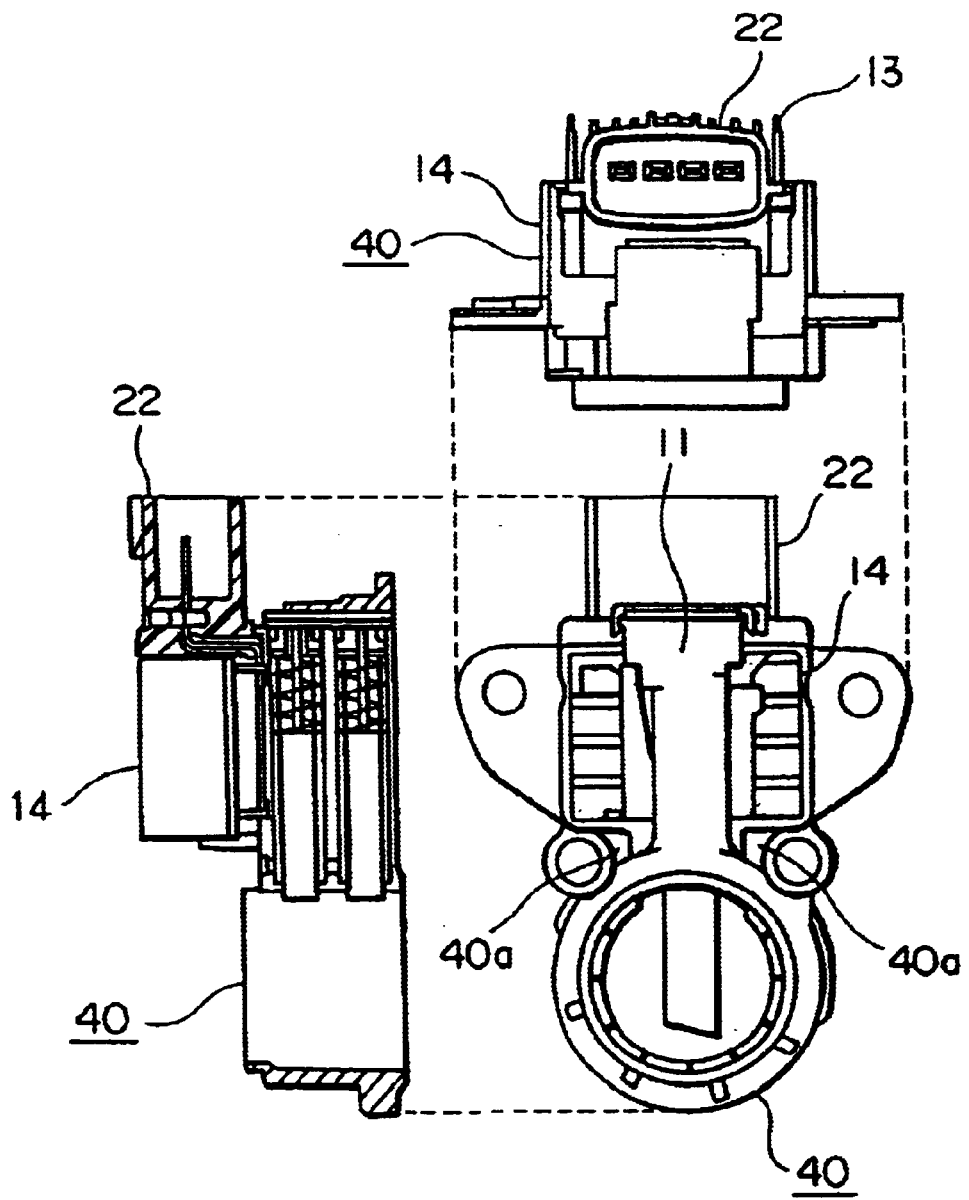
FIG. 4 is a drawing showing front, top and side views of a regulator assembly.

FIG. 4 is a drawing showing front, top and side views of a regulator assembly 40. In the regulator assembly 40 of the present embodiment, the regulator 14 and the brush holder 11 are disposed so as to overlap in an axial direction of the shaft 5, and the connector 22 is provided outside a radial direction of the regulator 14 and in proximity thereto, and an opening thereof faces toward the outside. The brush holder 11, regulator 14 and connector 22 are provided as one piece by molding. Center lines of the brush holder 11, regulator 14 and connector 22 are disposed on the same plane passing through a center axis of the shaft 5 and extending in a radial direction. Ventilating holes 40a are provided at both sides of the brush holder 11. The regulator 14 includes, at the rear side thereof, the heat sink 13 including a plurality of fins.

Figure 5:
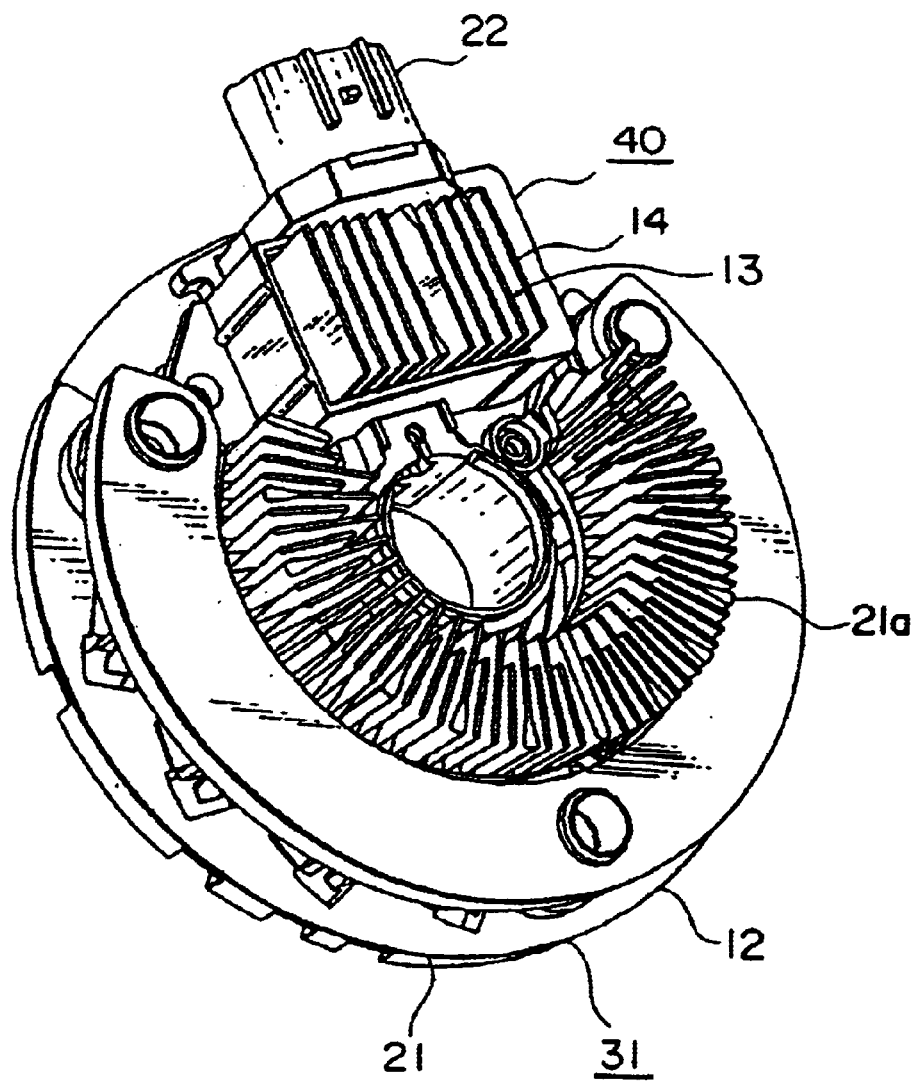
FIG. 5 is a perspective view of a regulator/rectifier assembly in which the regulator assembly and rectifier assembly are assembled together.

FIG. 5 is a perspective view of a regulator/rectifier assembly in which a rectifier assembly 31 and the regulator assembly 40 are assembled together. In the rectifier assembly 31, the rectifier 12 comprises diodes 20 mounted on an approximately C-shaped heat sink 21. The heat sink 21 includes a plurality of fins 21a at a rear side thereof.

Figure 6:
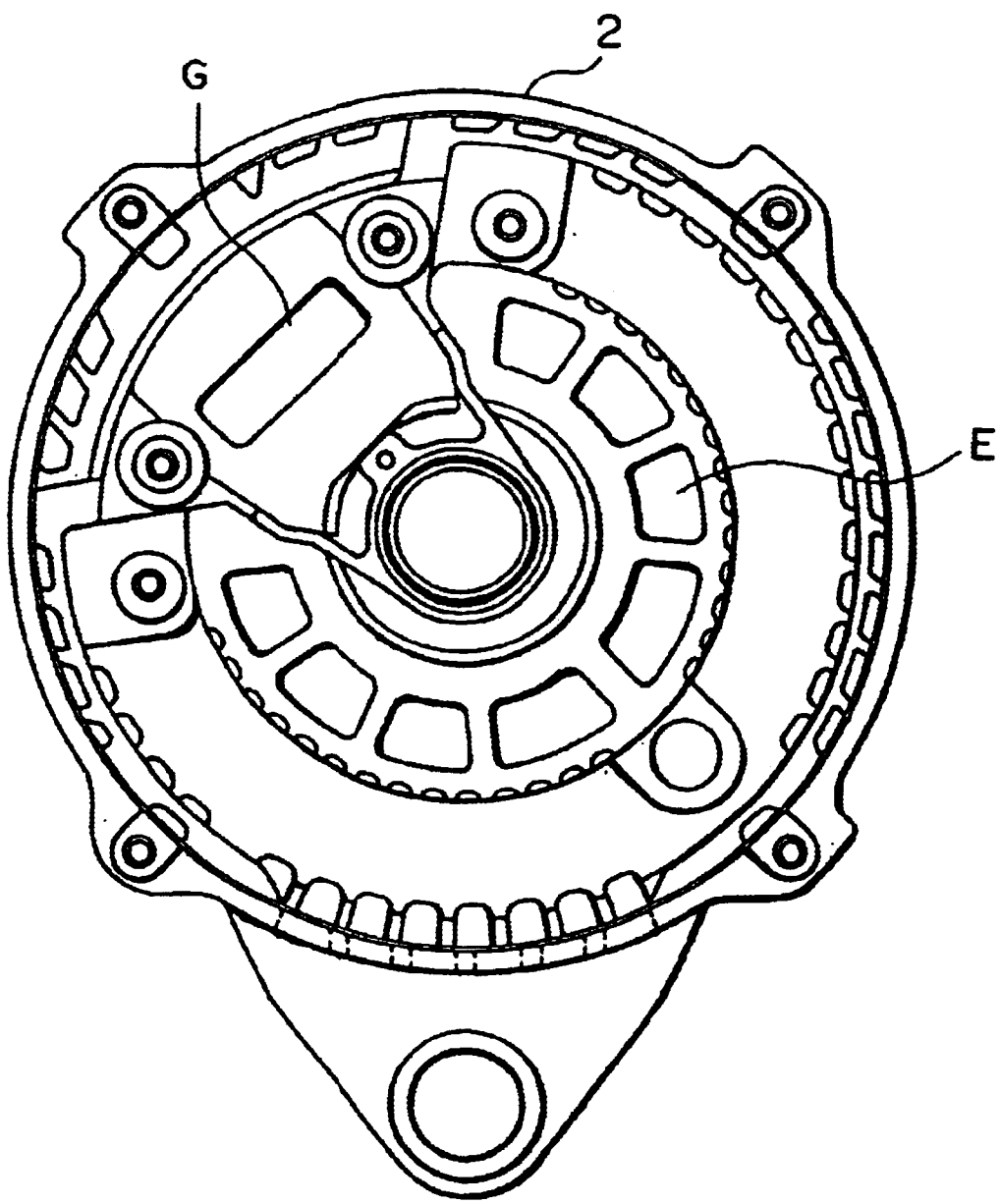
FIG. 6 is a front view of a rear bracket.
Figure 7:
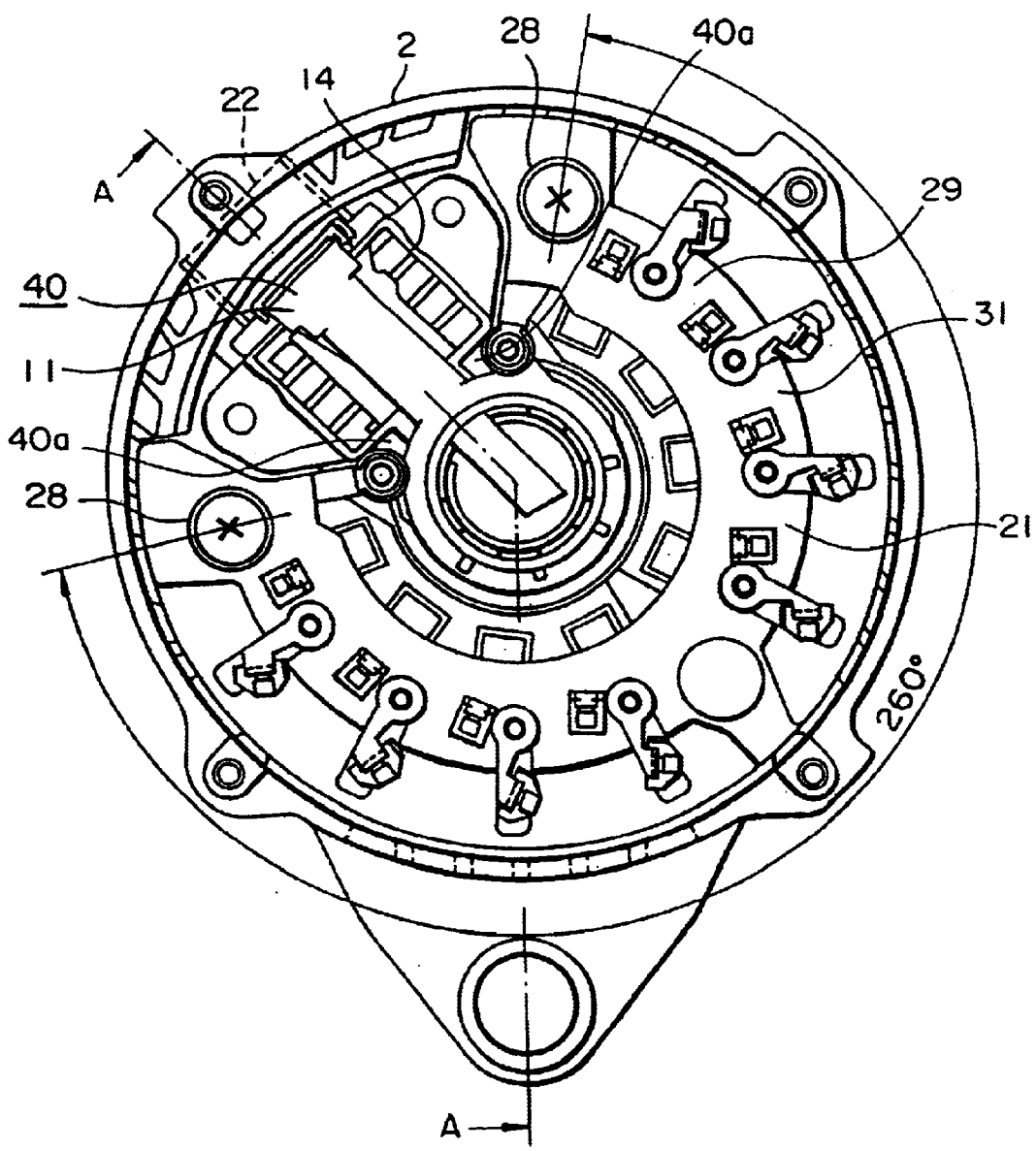
FIG. 7 is a front view of a rear bracket assembly.
Figure 8:
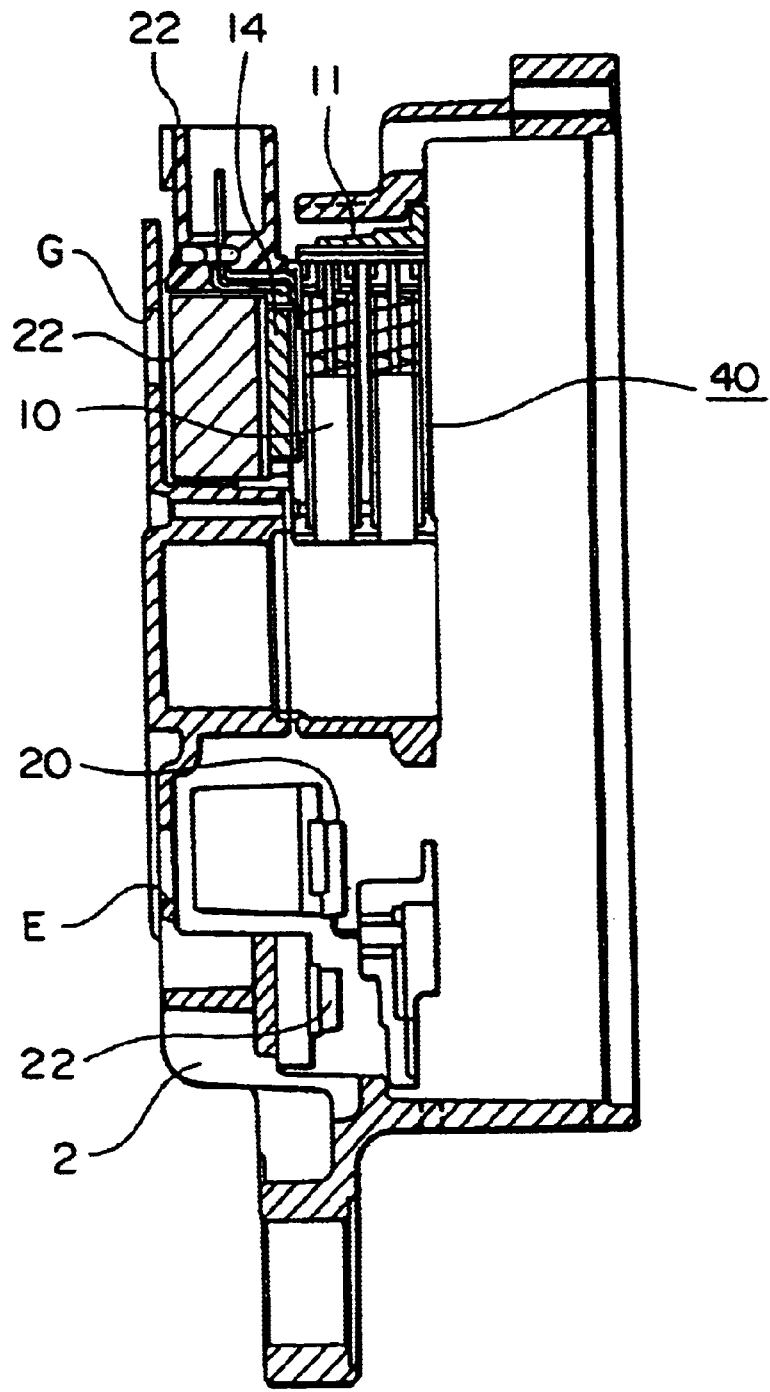
FIG. 8 is a cross section taken along the line A—A shown by the arrows in FIG. 7.
Figure 9:
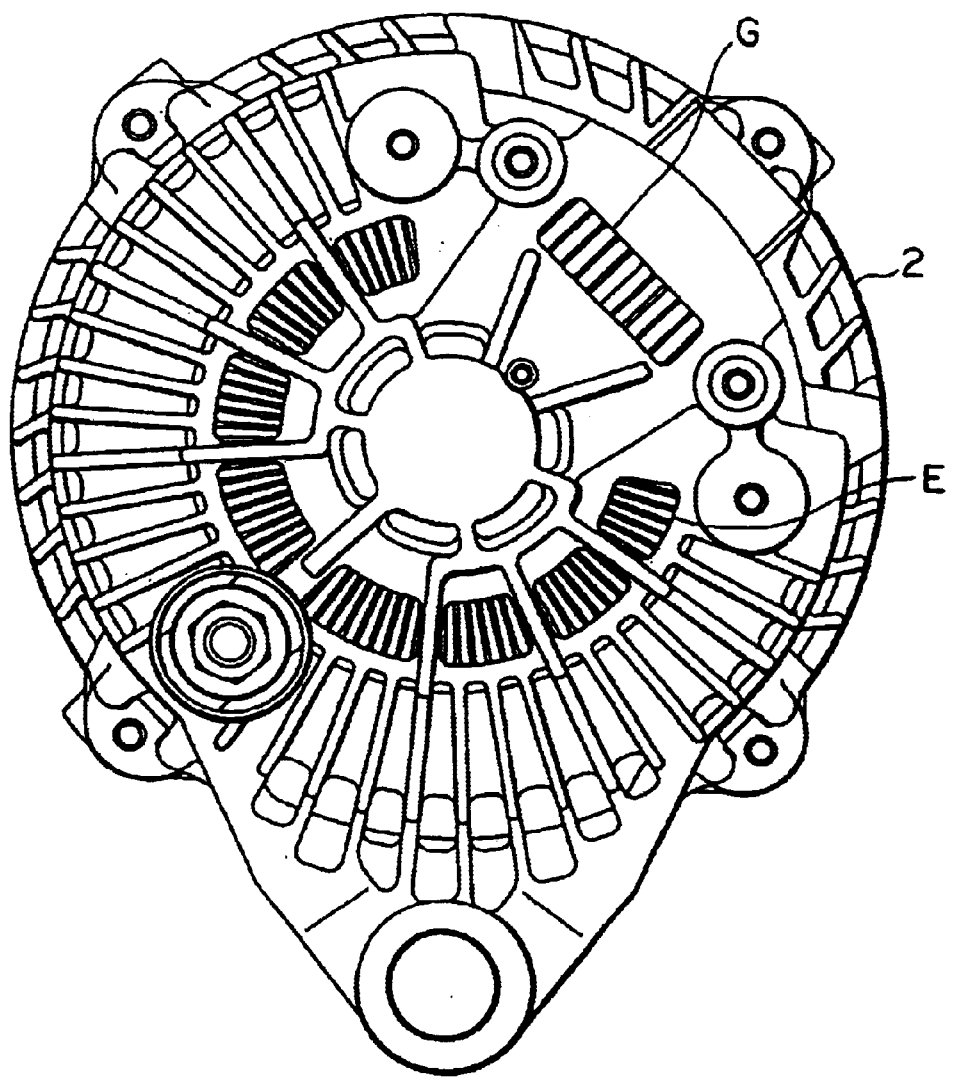
FIG. 9 is a drawing of the alternator as viewed from a rear side thereof.

FIG. 6 is a front view of a rear bracket. Moreover, FIG. 7 is a front view of a rear bracket assembly and FIG. 8 is a cross section taken along the line A—A shown by the arrows in FIG. 7. Further, FIG. 9 is a drawing of the alternator as viewed from a rear side thereof. In the present embodiment, the rectifier assembly 31 and regulator assembly 40 are assembled to the rear bracket 2 using approximately the same procedure as in a conventional example. Here, in the regulator assembly 40 of the present embodiment, center lines of the brush holder 11, regulator 14 and connector 22 are disposed on the same plane passing through the center axis of the shaft 5 and extending in a radial direction, as above. Thus, a roughly C-shaped length from one end to another in the regulator assembly 40, together with the rectifier assembly 31 of the present embodiment provided in the same plane orthogonally intersecting the shaft 5, is increased, increasing the entire surface area. In the present embodiment, there is an angle of 260 degrees between two (2) bolt holes 28 which are a standard for the size of the rectifier assembly 31, that is to say, the size of the heat sink 21.

The rectifier assembly 31 (rectifier 12) is of a shape that is plane symmetrical with respect to the plane including the center lines of the brush holder 11, regulator 14 and connector 22. A plurality of openings E are formed in the rear bracket 2 (case 3) at positions corresponding to the rectifier 12.

The automotive alternator constructed as above includes:
the shaft 5 supported in the case 3 so as to be capable of rotating;
the rotor 6 housed in the case 3 and comprising a plurality of magnetic poles (pole core 16) fixed to the shaft 5, the field winding (rotor coil 15), and the fans 7a, 7b fixed to at least one axial end of the magnetic poles; the stator 8 fixed to the case 3 so as to be positioned at an outer circumference of the rotor 6 and comprising the core 17 and the winding (stator coil 18A) wound in the core 17, and provided with coil ends 19 formed by bending back the winding at ends of the core;
the rectifier 12 disposed in the case 3 and comprising a rectifying element (diode 20) for rectifying an ac generated by the stator 8 to a dc and the heat dissipating plate (heat sink 21) for dissipating heat generated by the rectifying element;
the regulator 14 disposed in the case 3 for adjusting a magnitude of the ac voltage generated by the stator 8;
the brush 10 disposed in the case so as to advance and retreat in a radial direction of the rotor 6 and one end thereof contacting the rotor 6 to supply a field current to the field winding of the rotor 6; and
the connector 22 for mounting an external plug.

The case 3 contains a plurality of intake holes (openings E, G) at a side where the fan 7b of the rotor 6 is mounted, and cooling air drawn in from the intake holes is bent in a centrifugal direction after cooling the rectifier 12 to ventilate and cool the coil ends 19. On the other hand, after cooling the heat sink 13, cooling air from the intake hole G passes through ventilating holes 40a provided in a side of the brush holder 11 at inner diameter-side of the heat sink 13, is bent in a centrifugal direction and discharged to the outside.

The regulator 14 and the brush 10 are disposed so as to overlap in an axial direction, and center lines of the regulator 14, the brush 10, and the connector 22 are disposed on an approximately same plane extending in a radial direction, the rectifier 12 is disposed approximately line symmetrical to the same plane, and the plurality of intake holes E are formed in the rear bracket 2 at a position corresponding to the rectifier 12.

In the present embodiment, since the regulator 14 and the brush 10 are disposed so as to overlap in an axial direction, the brush 10 may be lengthened in a radial direction without disturbing the regulator 14 Thus, the life of the alternator may be increased.

Moreover, the surface area of the heat dissipating plate 21 of the rectifier 12 is increased and the number of fins 21a provided at a rear surface thereof may also be increased, and cooling characteristics of the rectifier 12 and brush 10 are improved. Furthermore, since a ventilating balance is good because the rectifier 12 and intake holes are provided line symmetrical relative to the regulator 14 having a large ventilating resistance, the brush 10, and the connector 22, cooling efficiency may be further improved and wind noise is reduced as well.

Also, the connector 22 is disposed at an outer circumferential side of the regulator 14 and brush 10 and center lines thereof are disposed on the same plane extending radially and passing through the shaft 5. Thus, the surface area of the heat dissipating plate 21 of the rectifier 12 may be further increased, ventilating resistance is further reduced, cooling characteristics are improved and wind noise is also reduced.

Furthermore, the coil ends 19 of the automotive alternator of the present embodiment do not roughly lap (overlap) the fans 7a, 7b in an axial direction and cooling air generated by the fans 7a, 7b ventilates ends of the coil ends 19. Hence, ventilating resistance at a discharge-side is reduced, cooling characteristics are improved and wind noise is also reduced.

Moreover, in the present embodiment, although center lines of the brush holder 11, regulator 14 and connector 22 are disposed on the same plane passing through a center axis of the shaft 5 and extending in a radial direction, a similar effect can be obtained when the center lines are disposed on substantially the same plane.

Embodiment 2

Figure 10:
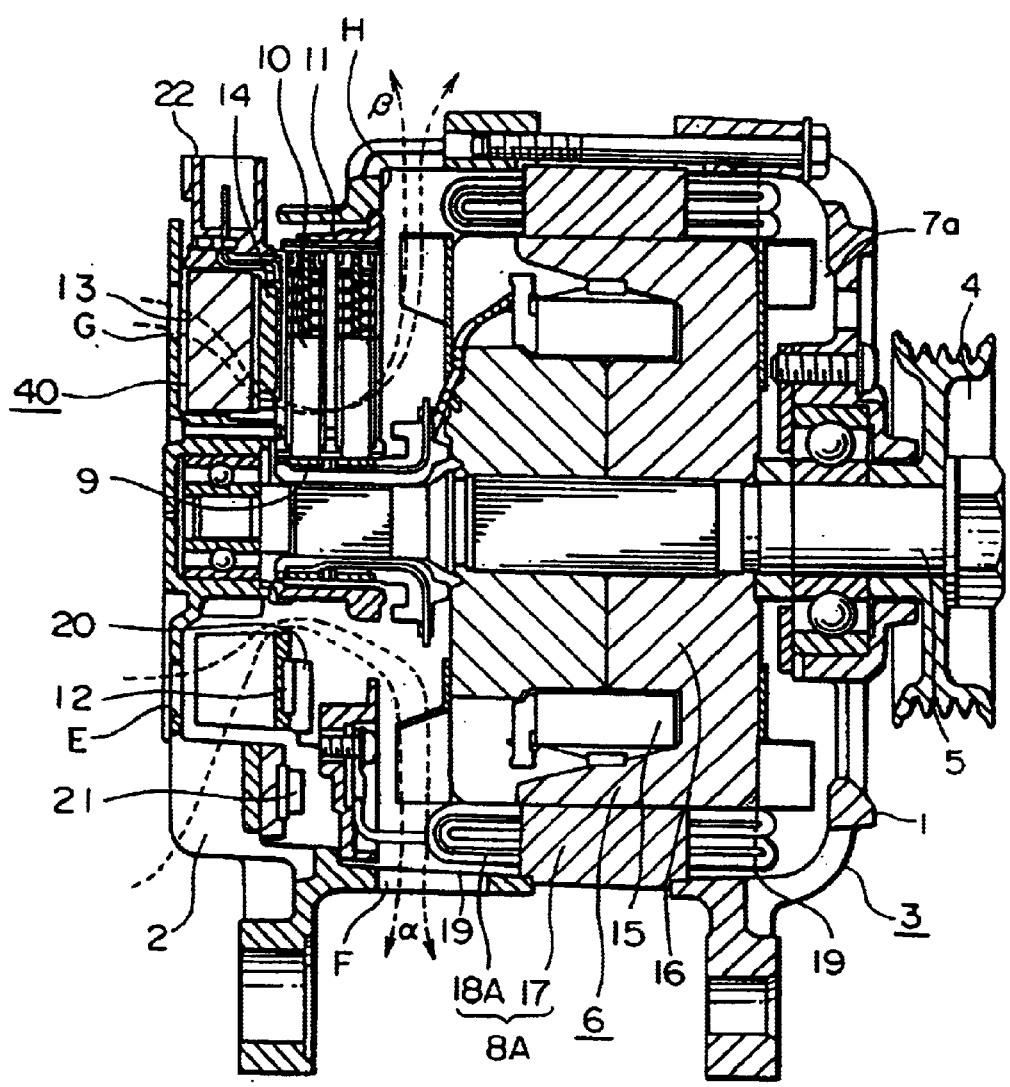
FIG. 10 is a cross section showing an automotive alternator according to Embodiment 2 of the present invention.
Figure 11:
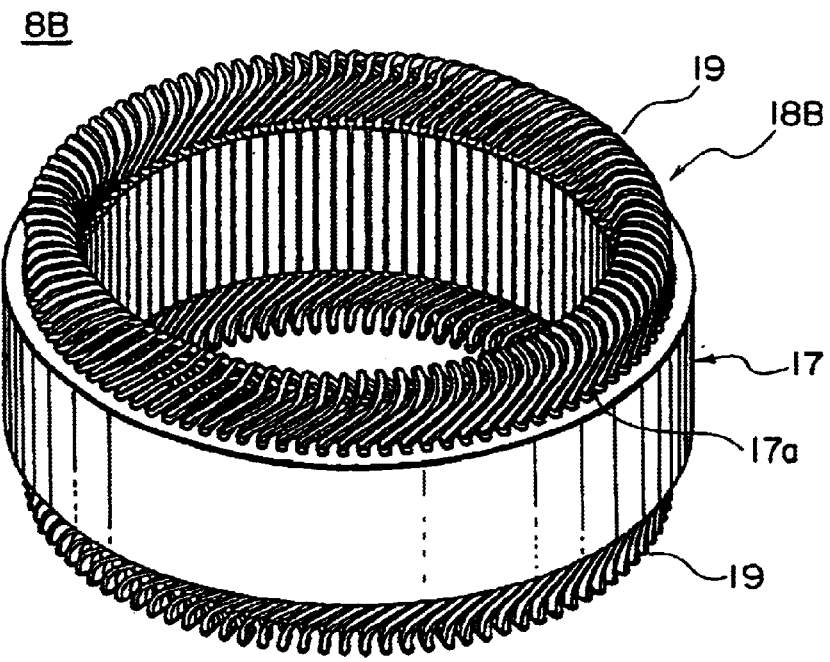
FIG. 11 is a perspective view of a stator of the alternator according to Embodiment 2 of the present invention.
Figure 12:
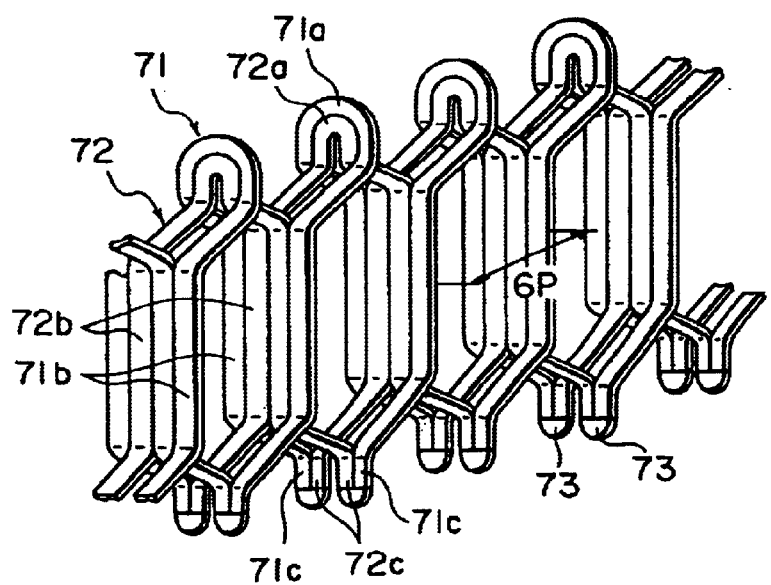
FIG. 12 is a perspective view showing an essential portion of one phase of a stator winding according to Embodiment 2 of the present invention.

FIG. 10 is a cross section showing an automotive alternator according to this embodiment of the present invention. FIG. 11 is a perspective view of a stator of the alternator. FIG. 12 is a perspective view showing an essential portion of one phase of a stator winding.

Figure 13:
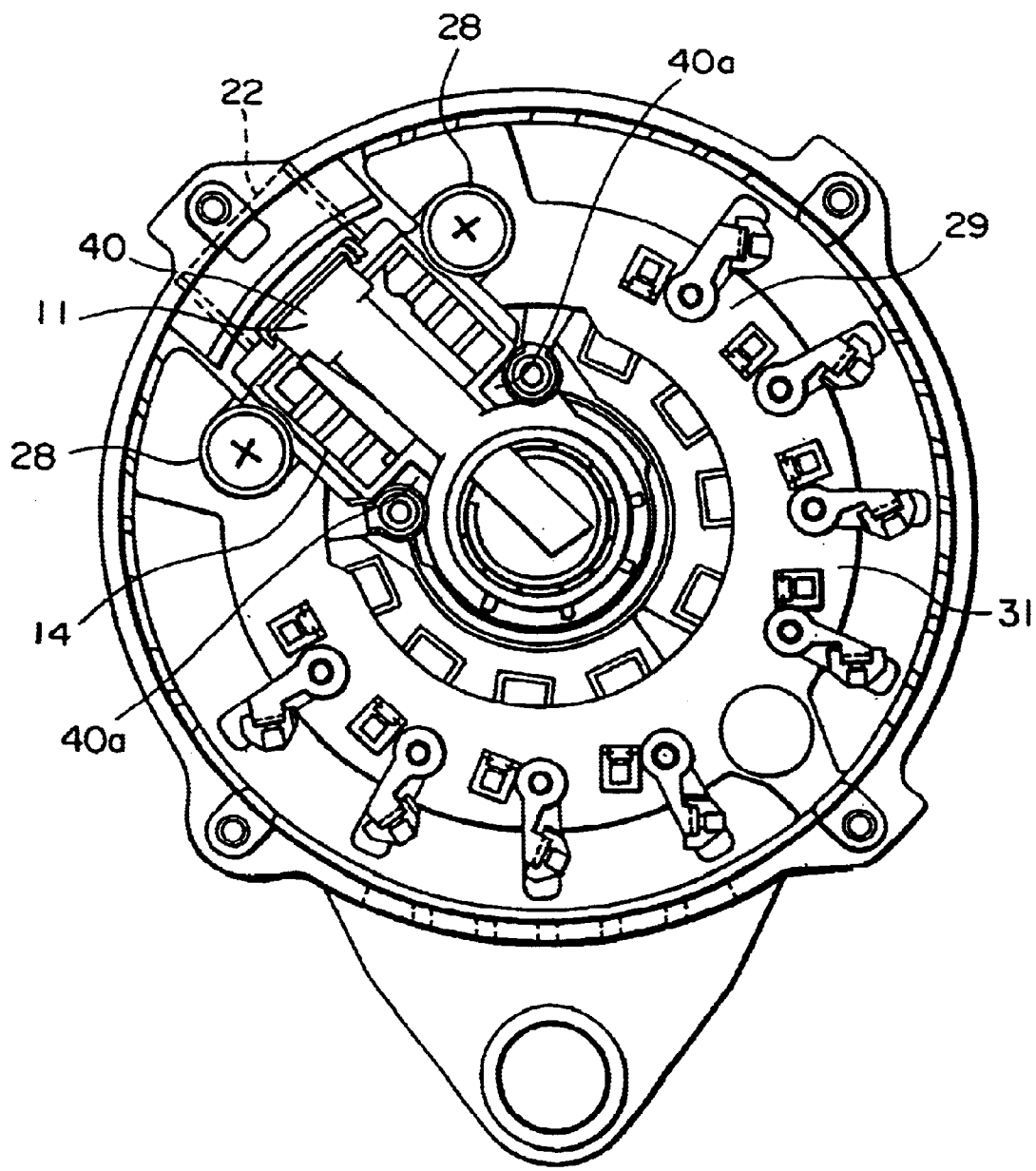
FIG. 13 is a front view of a rear bracket assembly showing another example of an automotive alternator of the present invention.

The construction of a stator 8B of the present embodiment will be explained with reference to FIGS. 10 to 12. Moreover, FIG. 13 is a front view of a rear bracket assembly showing another example of an automotive alternator of the present invention.

The stator 8B includes the cylindrical stator core 17 formed with a number of slots 17a extending in an axial direction at a predetermined pitch in a circumferential direction, and the stator coil 18B in which conductor wire is bent back outside the slots at end surfaces of the stator core 17 and wound so as to alternately occupy an inner layer and an outer layer within the slots at an interval of six (6) slots.

Large conductor segments 71 and small conductor segments 72, formed by bending insulation coated short copper wire material into an approximate U-shape, are used in the conductor wire comprising the stator coil 18B. The large conductor segment 71 is formed in an approximate U-shape connecting a pair of slot insertion portions 71b by means of a turn portion 71a. The small conductor segment 72 is formed in an approximate U-shape connecting a pair of insertion portions 72b by means of a turn portion 72a. Moreover, ninety-six (96) slots 17a are provided in the stator core 17.

First, in pairs of slots 17a six slots apart, short conductor segments 72 are inserted from a rear side of the stator 17 into third positions and second positions from an inner circumferential side of a slot depth direction, and, in pairs of slots 17a six slots apart, large conductor segments 71 are inserted from a rear side of the stator 17 into first positions and fourth positions from an inner circumferential side of a slot depth direction. Thus, within each slot 17a, four (4) slot insertion portions 71b, 72b are arranged to line up in a row in a radial direction (slot depth direction).

Next, disconnected ends of large conductor segments 71 and short conductor segments 72 extending at a front side of the stator core 17 are bent so as to open outward. Disconnected end portions 72c of the short conductor segments 72 extending from the second position of slots 17a overlap, in a radial direction, disconnected end portions 71c of the long conductor segments 71 extending from the first position of slots 17a six slots apart and are joined (therewith) by arc welding and the like. Similarly, Disconnected end portions 71c of the long conductor segments 71 extending from the fourth position of slots 17a overlap, in a radial direction, disconnected end portions 72c of the short conductor segments 72 extending from the third position of slots 17a six slots apart and are joined (therewith) by arc welding and the like.

Accordingly, long conductor segments 71 and short conductor segments 72 inserted in the same slot groups comprising slots 17a arranged at a pitch of six slots (6P) are joined, and one turn of winding per slot group forms four (4) strands. Then, the four strands of winding inserted in each slot group are connected in series to form one phase of the stator winding having four turns. That is, since there are six (6) sets of slot groups comprising every sixth slot 17a, a total of six phases of the stator winding are formed in this manner. Then, three phases of the stator winding are AC wire bound to construct a three-phase AC winding. Thus, the stator coil 18B constructed from two (2) sets of three-phase AC winding is wound in the stator core 8B to obtain the stator 8B.

Figure 14:
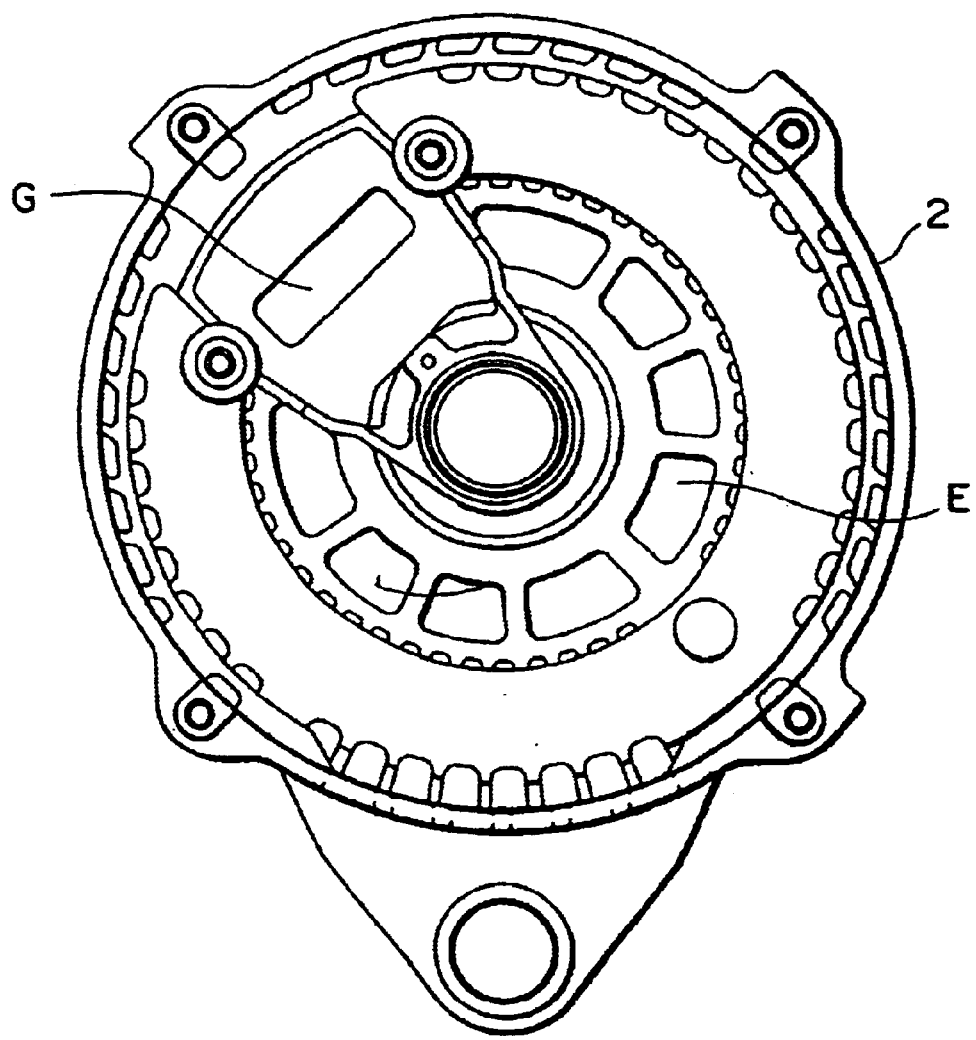
FIG. 14 is a front view of the rear bracket.
Figure 15:
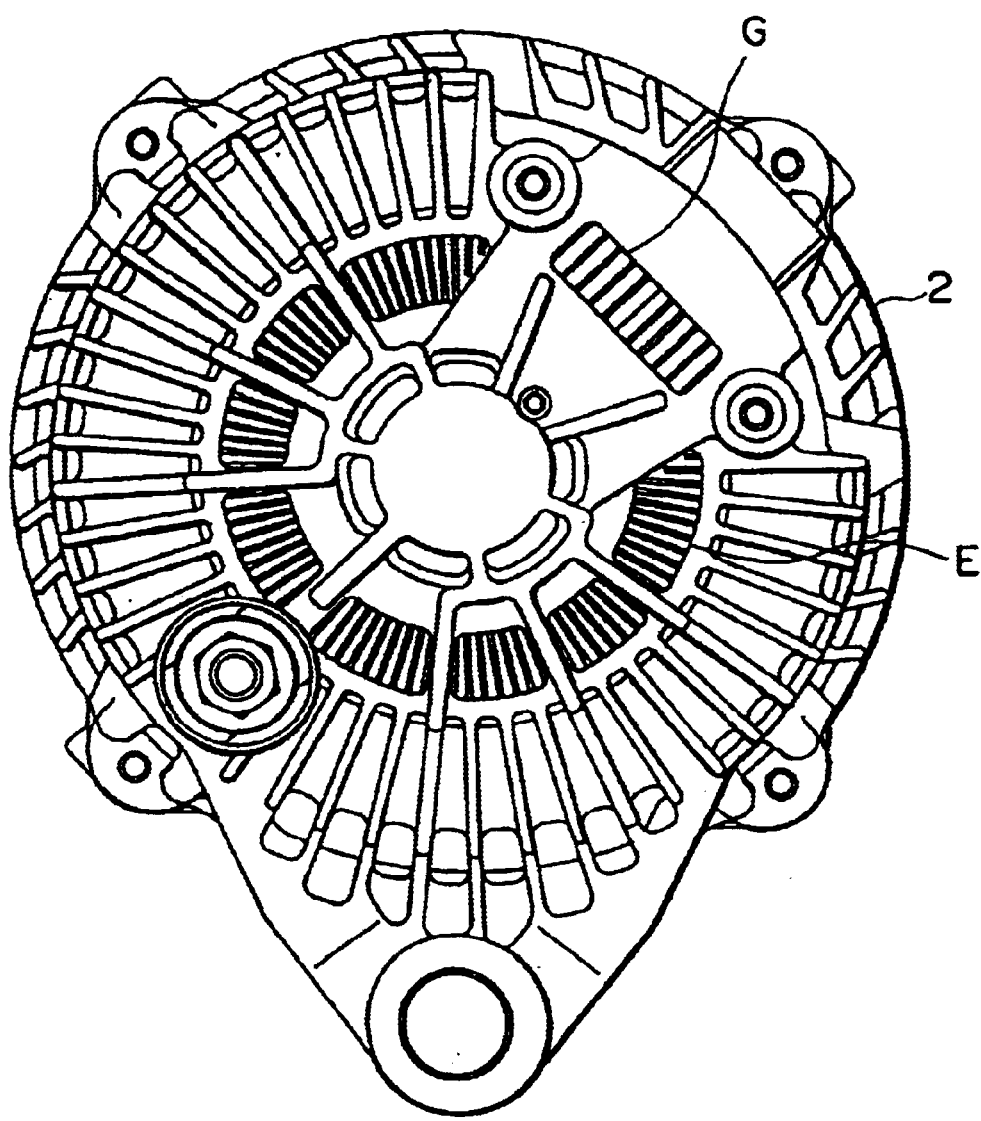
FIG. 15 is a drawing of the alternator as viewed from a rear side thereof.

FIG. 13 is a front view of a rear bracket assembly showing another example of an automotive alternator of the present invention. FIG. 14 is a front view of the rear bracket. FIG. 15 is a drawing of the alternator as viewed from a rear side thereof. In the rectifier assembly 31 of the present embodiment, a roughly C-shaped length from one end to another is further increased, increasing the entire surface area as well. Ends of the rectifier assembly 31 overlap ends of the regulator assembly 40 in an axial direction. Bolts 28 as fixing means simultaneously fix both the rectifier assembly 31 and the regulator assembly 40.

As shown in FIGS. 14 and 15, a plurality of openings E are formed in the rear bracket 2 at positions corresponding to the rectifier 12 and the openings E, accompanying the enlargement of the rectifier assembly 31, are larger than the conventional example. Thus, an amount of cooling air is increased and cooling efficiency is improved.

Moreover, in the automotive alternator constructed as above, the fixing means is used for both the regulator 14 and the rectifier 12. Hence, empty space can be utilized for enlarging the heat dissipating plate of the rectifier 12, cooling efficiency is improved, ventilating resistance is further reduced and wind noise is lowered as well.

Furthermore, in the coil ends 19 of the present embodiment, end portions lap (overlap) fans 7a, 7b in an axial direction. In accordance with the above construction, the cooling characteristics of the stator 8 are improved, an increase in ventilating resistance at the discharge side is prevented, cooling efficiency of the rectifier 12 is improved and wind noise is reduced.

Embodiment 3

Figure 16:
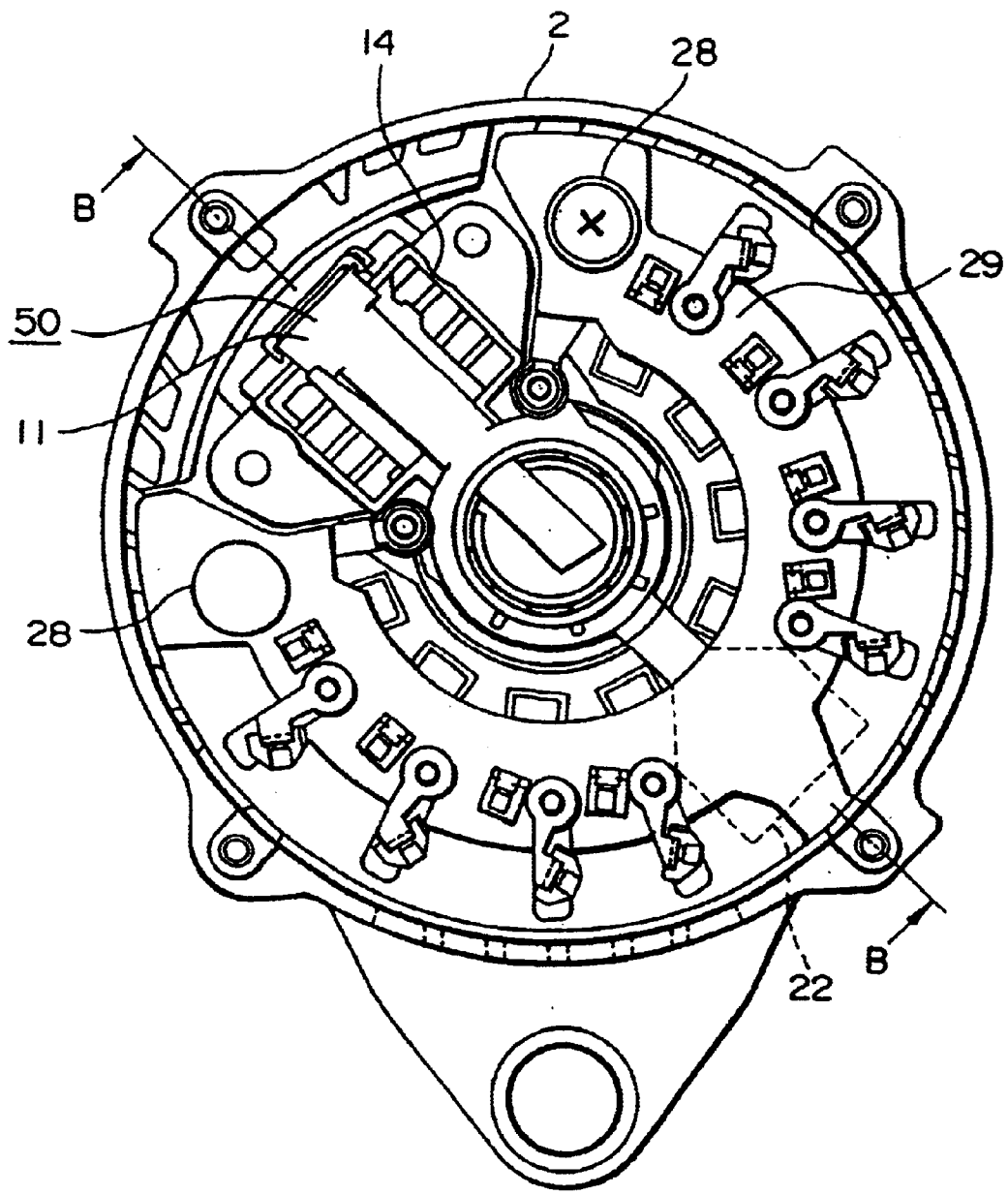
FIG. 16 is a front view of a rear bracket assembly of an automotive alternator according to Embodiment 3 of the present invention.
Figure 17:
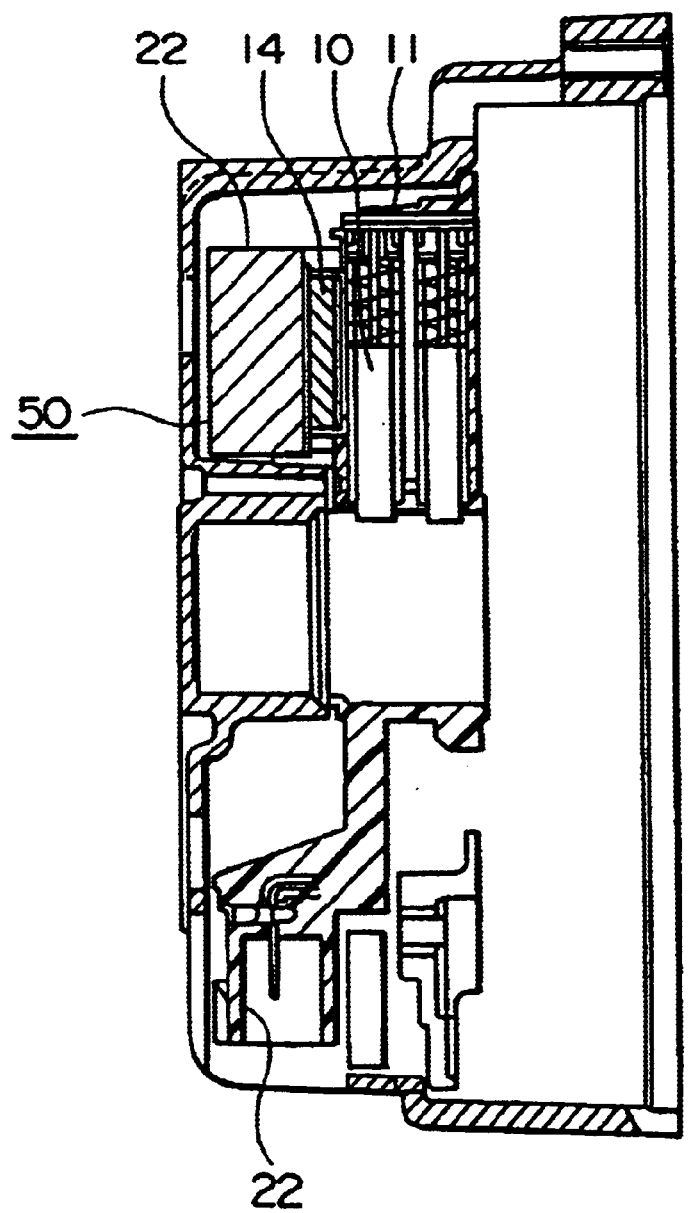
FIG. 17 is a cross section taken along the line B—B shown by the arrows in FIG. 16.

FIG. 16 is a front view showing still another example of a rear bracket assembly of an automotive alternator of the present invention. FIG. 17 is a cross section taken along the line B-B shown by the arrows in FIG. 16. The connector 22 is not provided in a regulator assembly 50 of the present invention. The connector 22 is disposed at a position point symmetrical with the regulator assembly 50 with the shaft 5 as a center. Center lines of the brush holder 11, regulator 14 and connector 22 are disposed on a same plane passing through a center axis of the shaft 5 and extending in a radial direction.

In the automotive alternator constructed as above, the regulator 14 and brush 10 are disposed at a location point symmetrical with the connector 22 with the shaft 5 as a center and the center lines thereof are disposed on the same plane extending in a radial direction. Thus, ventilating resistance is made laterally symmetrical, an unbalance is corrected, cooling efficiency is improved and wind noise is reduced.

Embodiment 4

Figure 18:
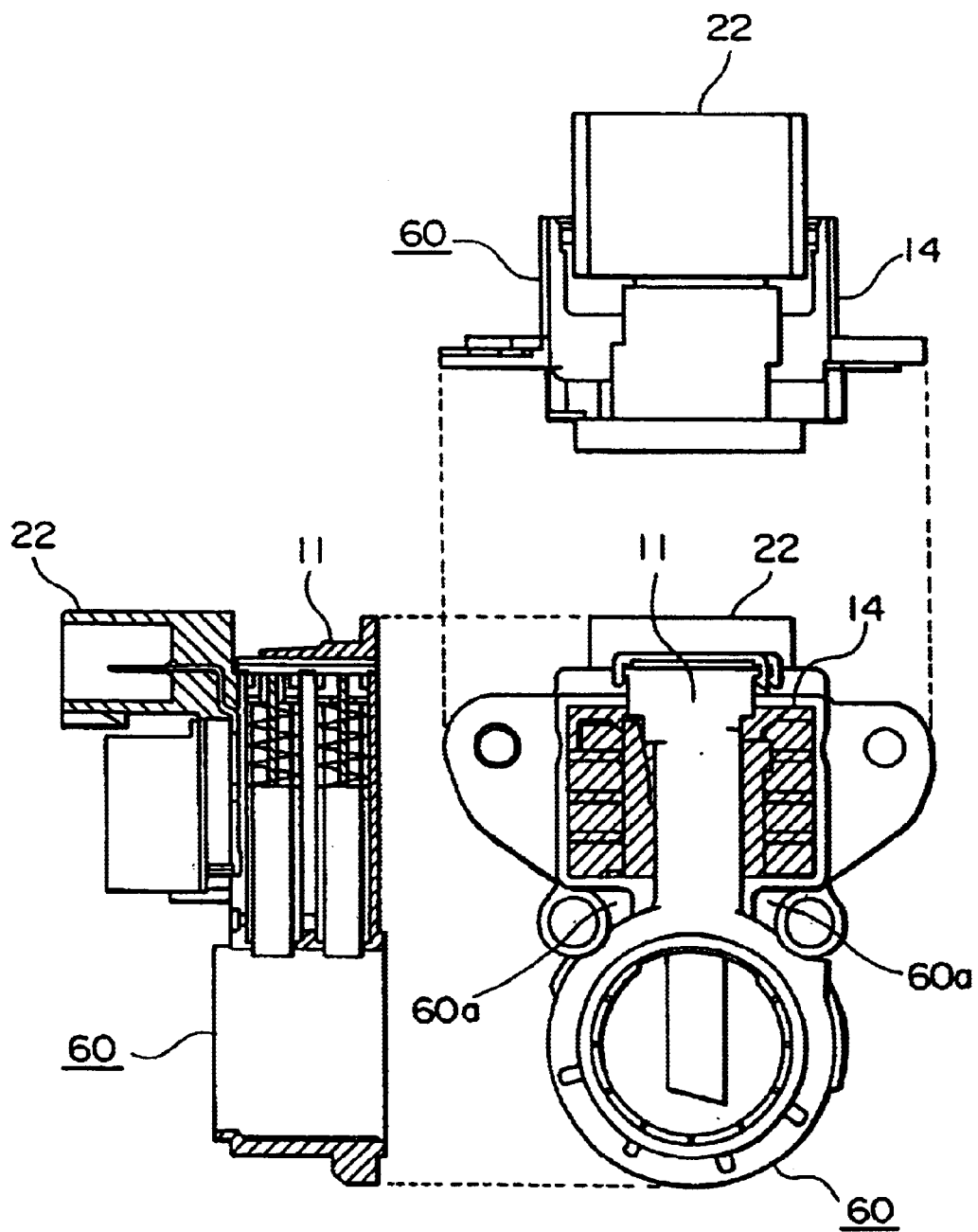
FIG. 18 is a drawing showing front, top and side views of a regulator assembly of an automotive alternator according to Embodiment 4 of the present invention.
Figure 19:
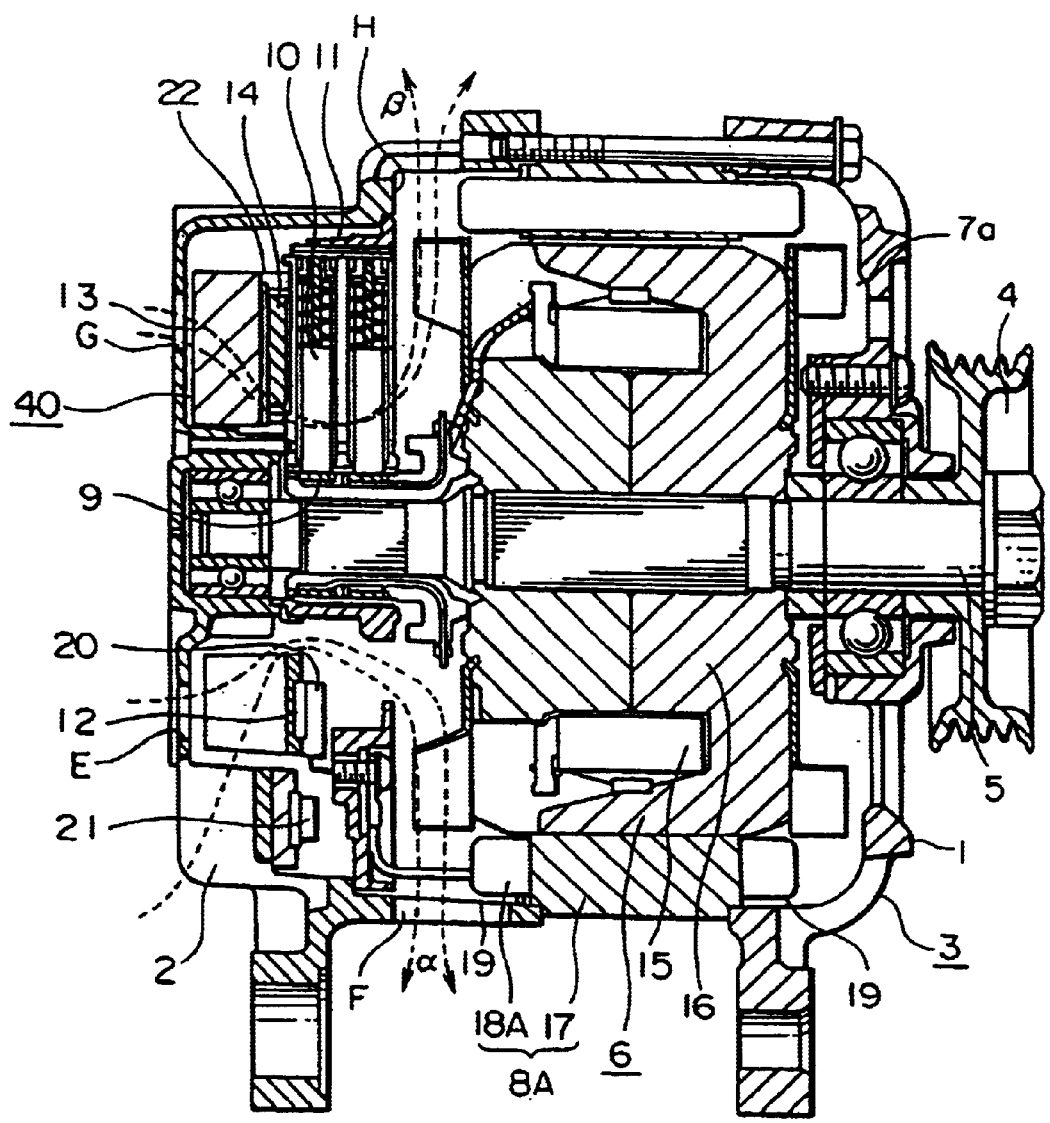
FIG. 19 is a cross section showing a conventional automotive alternator for use in an automobile.
Figure 20:
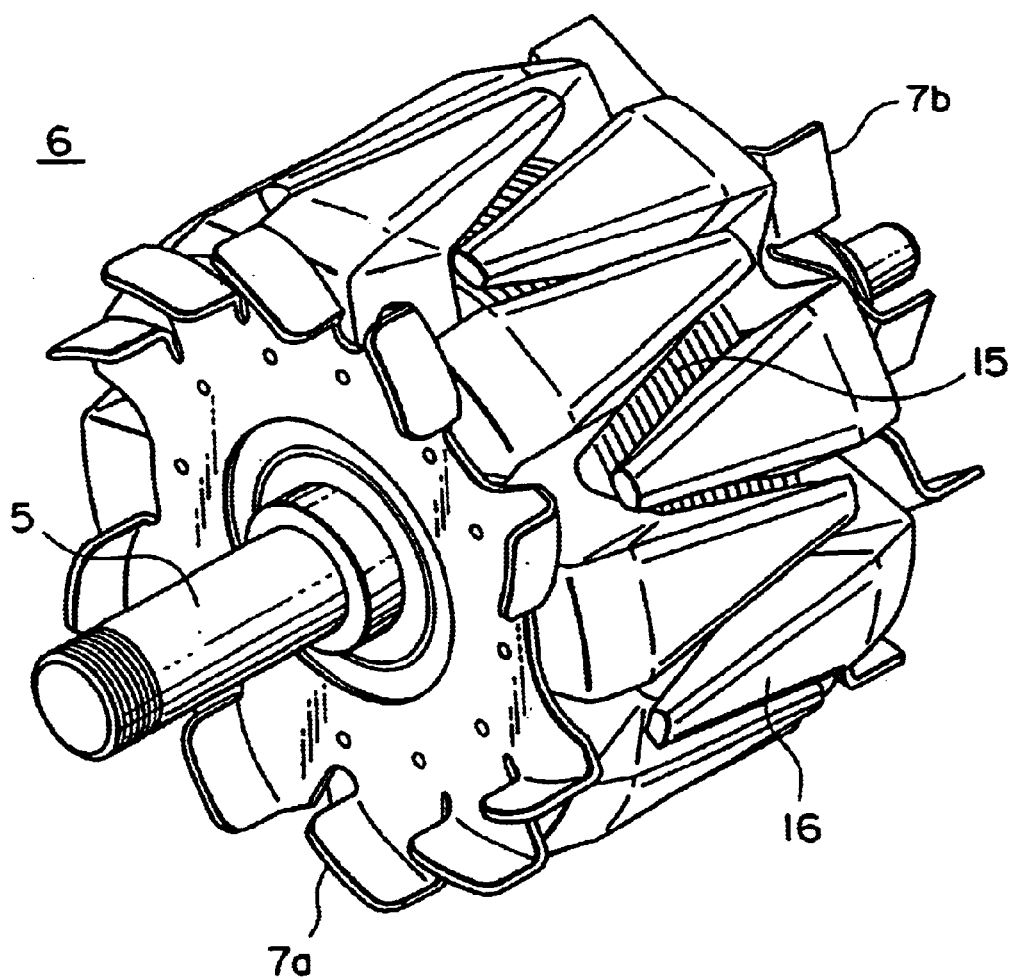
FIG. 20 is a perspective view of the conventional dynamo-electric generator (alternator).
Figure 21:
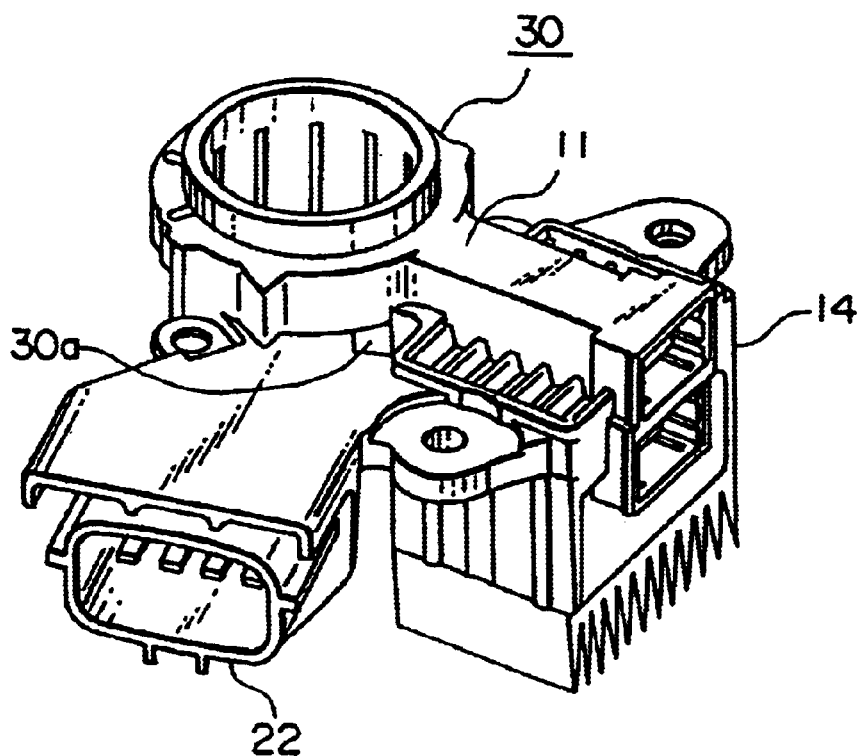
FIG. 21 is a perspective view of a conventional regulator assembly.
Figure 22:
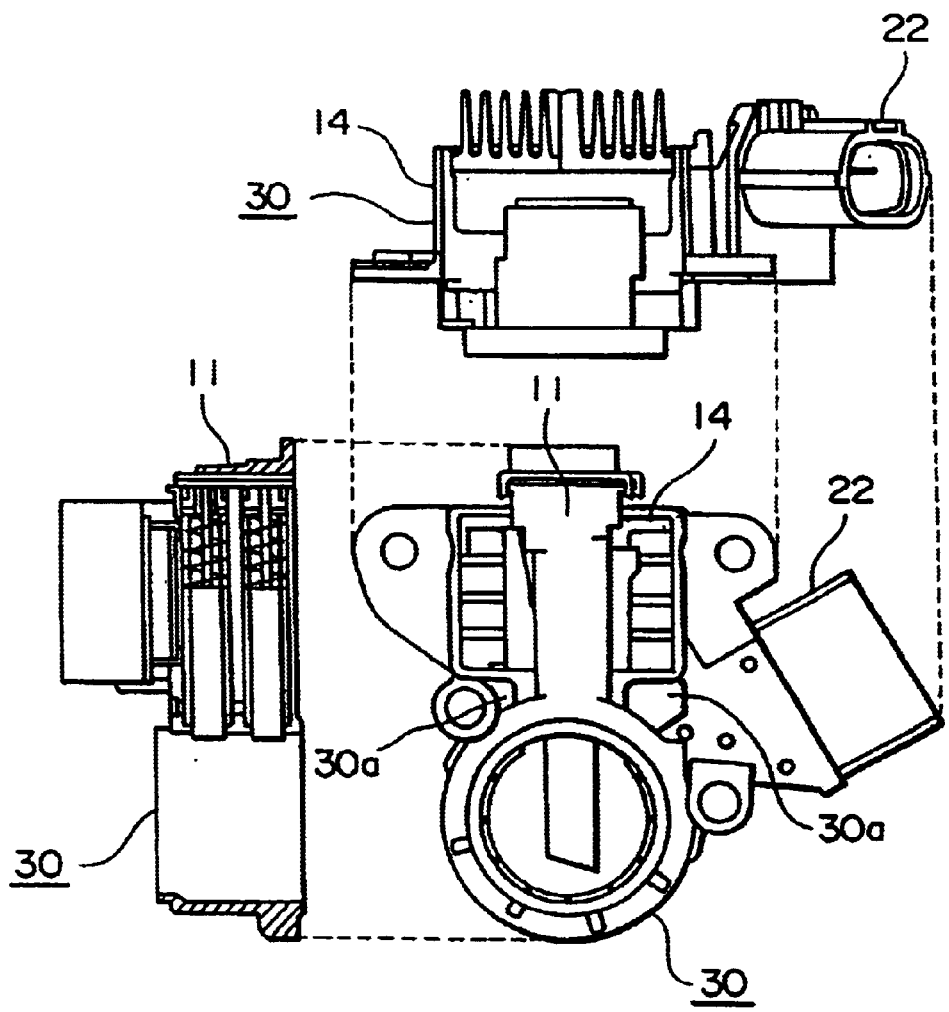
FIG. 22 is a drawing showing front, top and side views of the conventional regulator assembly.
Figure 23:
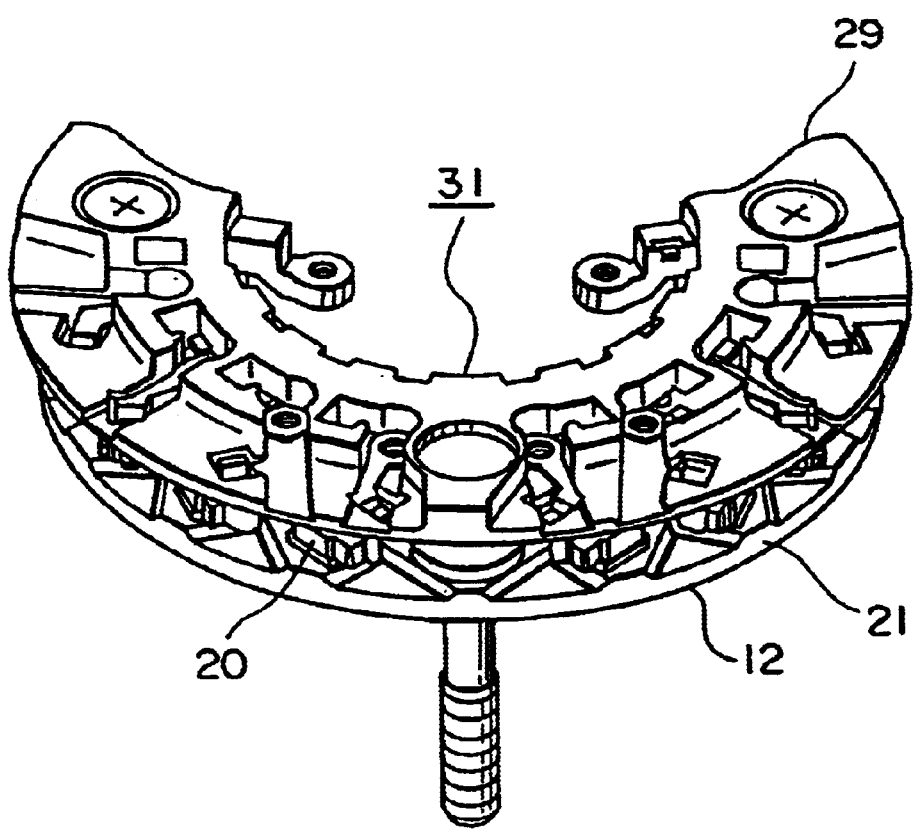
FIG. 23 is a perspective view of a rectifier assembly in which a rectifier is assembled with a circuit board.
Figure 24:
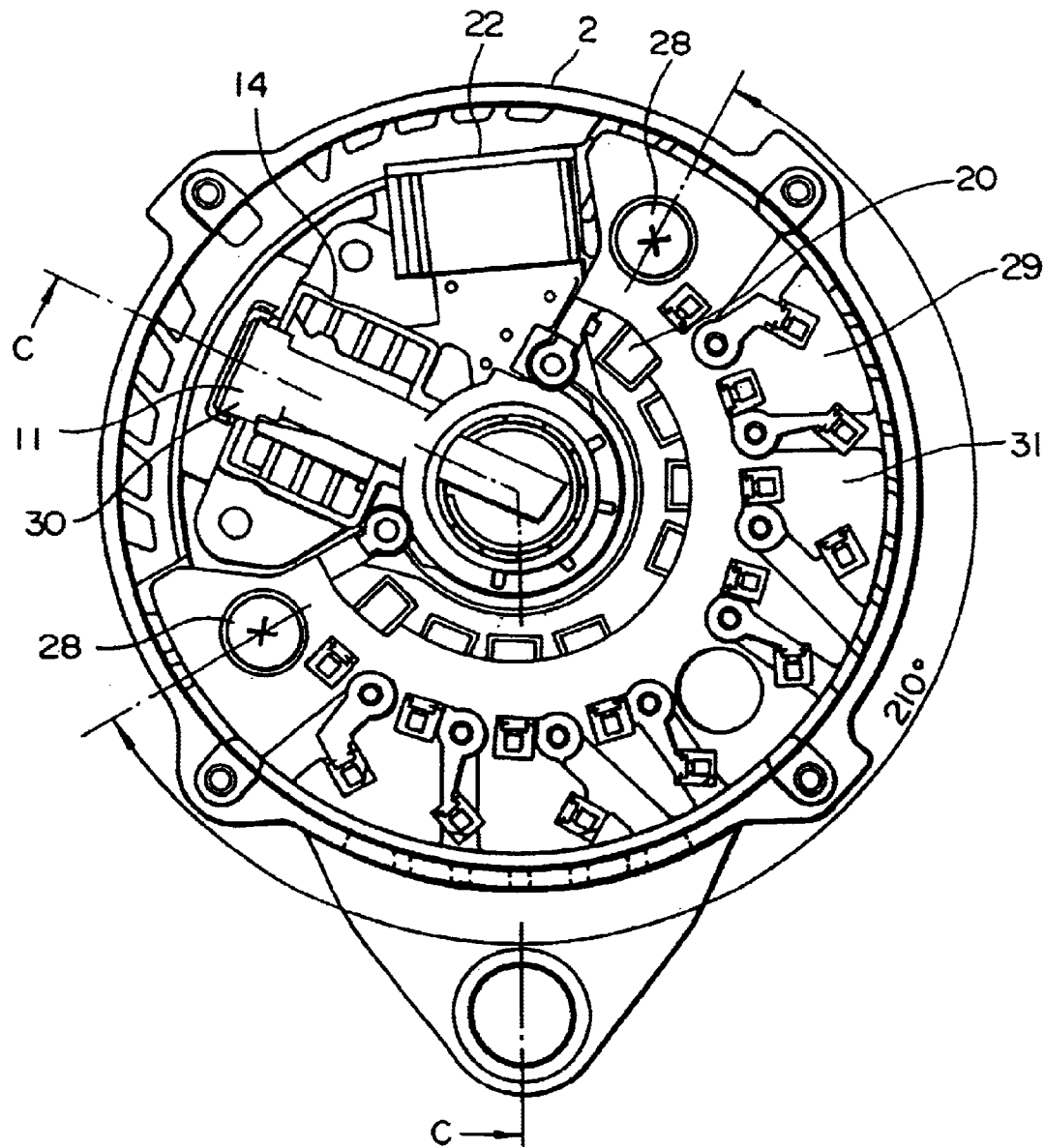
FIG. 24 is a front view of a conventional rear bracket assembly.
Figure 25:
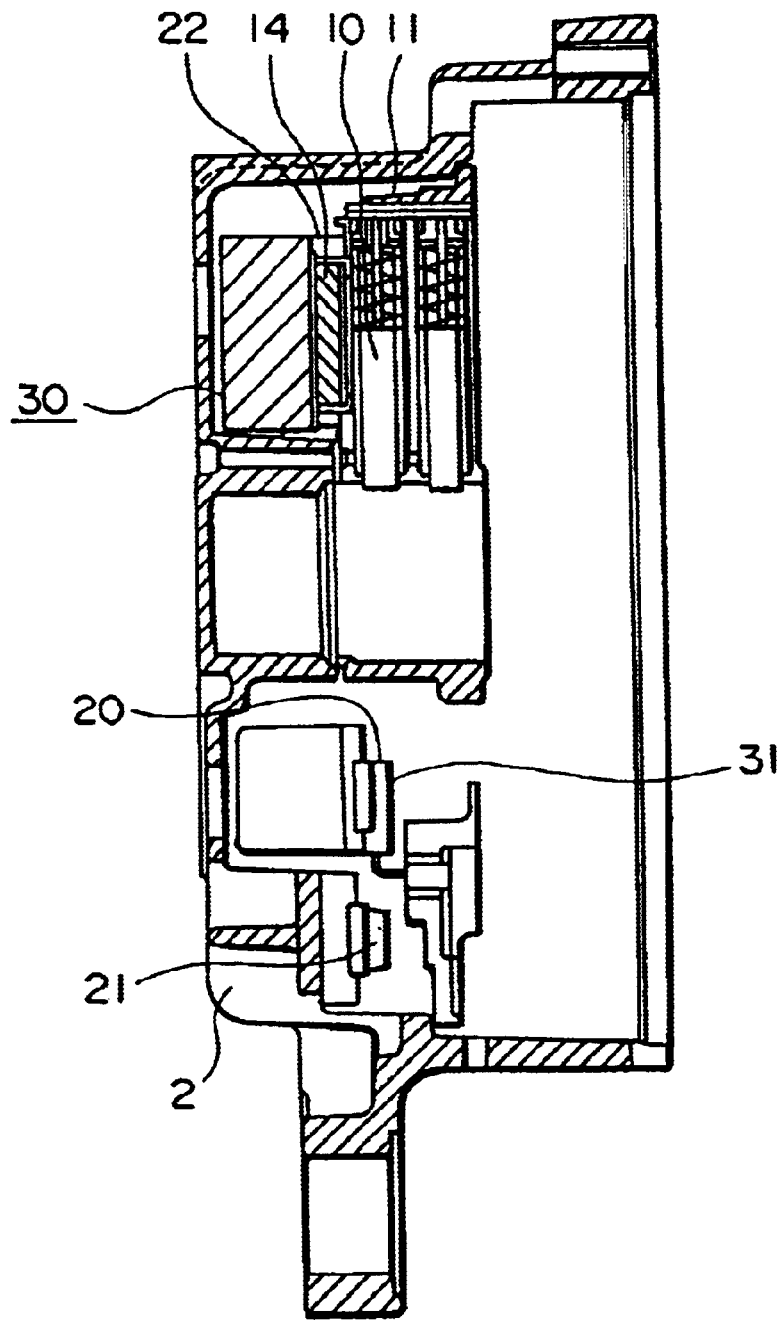
FIG. 25 is a cross section taken along the line C—C shown by the arrows in FIG. 24.
Figure 26:
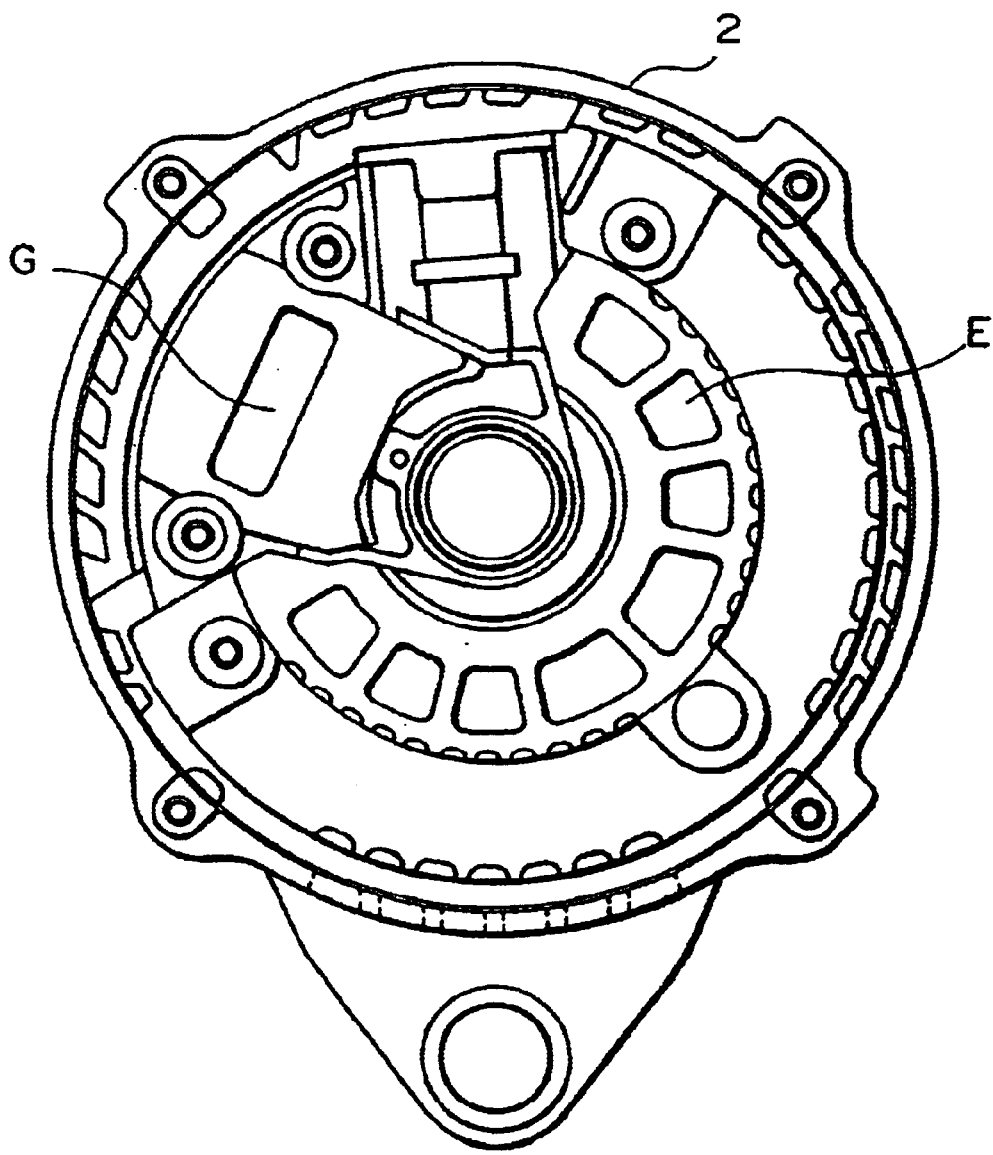
FIG. 26 is a front view of a conventional rear bracket.
Figure 27:
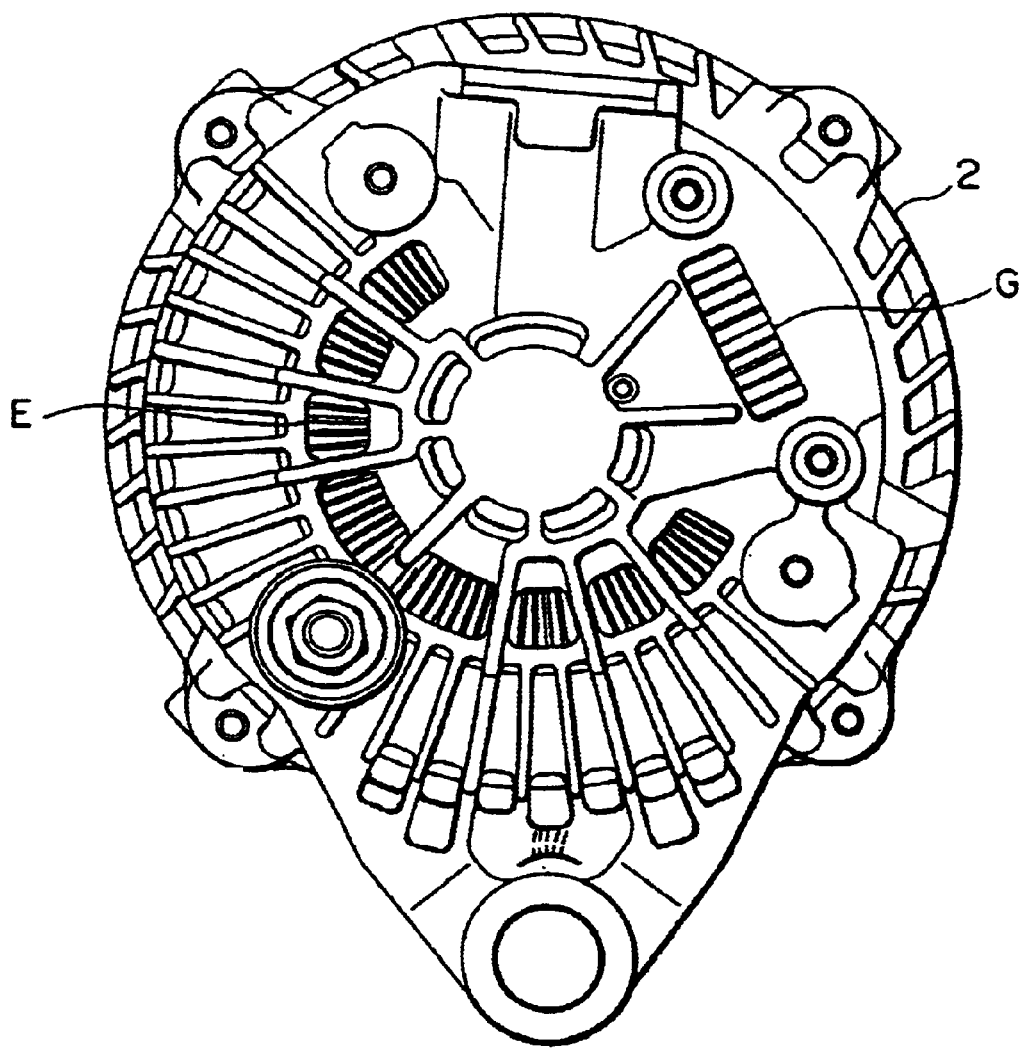
FIG. 27 is a drawing of the conventional alternator viewed from a rear side thereof.

FIG. 18 is a drawing showing front, top and side views of a regulator assembly of yet another automotive alternator of the present invention. In a regulator assembly 60 of the present embodiment, the regulator 14 and brush holder 11 overlap in an axial direction of the shaft 5 and the connector 22 is provided outside a radial direction of the regulator 14, and adjacent thereto, and an opening thereof is provided facing toward the rear of the alternator.

In the automotive alternator constructed as above, the regulator 14 and brush 10 are disposed so as to overlap in an axial direction and the connector 22 is disposed so as to overlap with the brush holder 11 in an axial direction, and center lines thereof are disposed on the same plane extending in a radial direction. Thus, the connector does not protrude to an outer circumferential-side and the size of the alternator may be reduced.

Moreover, although in the present embodiment the connector 22 is disposed so as to overlap with the brush holder 11 in an axial direction, the brush 10, regulator 14 and connector 22 may also be disposed so as to overlap in an axial direction to obtain a similar effect.

Also, although the rectifier including two (2) sets of three-phase full-wave rectification diodes comprising a total of sixteen (16), combining additional diode(s), was used as an example in the present embodiment, a case in which one (1) set of eight (8) diodes, or, twelve (12) or six (6) diodes with no additional diode(s), are employed is also acceptable. In this case, since the surface area of the heat sink increases with each additional diode, the structure in the present embodiment is made further effective.

The automotive alternator according to the present invention comprises:
  the shaft supported in the case so as to be capable of rotating;
  the rotor housed in the case and comprising a plurality of magnetic poles fixed to the shaft, the field winding, and the fans fixed to at least one axial end of the magnetic poles; the stator fixed to the case so as to be positioned at an outer circumference of the rotor and comprising the core and the winding wound in the core, and provided with coil ends formed by bending back the winding at ends of the core;
  the rectifier disposed in the case and comprising a rectifying element for rectifying an ac generated by the stator to a dc and the heat dissipating plate for dissipating heat generated by the rectifying element;

the regulator disposed in the case for adjusting a magnitude of the ac voltage generated by the stator;

the brush disposed in the case so as to advance and retreat in a radial direction of the rotor and one end thereof contacting the rotor to supply a field current to the field winding of the rotor;

the connector for mounting an external plug; and the case contains a plurality of intake holes at a side where the fan of the rotor is mounted, and cooling air drawn in from the intake holes is bent in a centrifugal direction after cooling the rectifier to ventilate and cool the coil ends; wherein, the regulator and the brush are disposed so as to overlap in an axial direction, and center lines of the regulator, the brush, and the connector are disposed on an approximately same plane extending in a radial direction, the rectifier is disposed approximately line symmetrical to the same plane, and the plurality of intake holes are formed in the rear bracket at a position corresponding to the rectifier.

Hence, since the regulator and the brush are disposed so as to overlap in an axial direction, the brush may be lengthened in a radial direction without disturbing the regulator. Thus, the life of the alternator may be increased.

Moreover, the surface area of the heat dissipating plate of the rectifier is increased and the cooling characteristics of the rectifier are improved. Furthermore, since a ventilating balance is good because the rectifier and intake holes are provided line symmetrical relative to the regulator having a large ventilating resistance, the brush, and the connector, cooling efficiency may be further improved and wind noise is reduced as well.

Also, the regulator and the brush are disposed approximately point symmetrical with the connector with the shaft as a center, and center lines of the regulator, brush and connector are disposed on an approximately same plane extending in a radial direction. Thus, ventilating resistance is made laterally symmetrical, cooling efficiency is improved and wind noise is reduced.

Moreover, the connector is disposed at an approximately outer circumferential-side of the regulator and the brush, and center lines of the connector, the regulator and the brush are disposed on an approximately same plane extending in a radial direction. Thus, the surface area of the heat dissipating plate of the rectifier may be further increased, ventilating resistance is further reduced, cooling characteristics are improved and wind noise is also reduced.

Furthermore, the regulator and the brush are disposed so as to overlap in an axial direction, the connector is disposed so as to further overlap the regulator and the brush in an axial direction, and center lines of the regulator, the brush, and the connector are disposed on an approximately same plane extending in a radial direction. Thus, the connector does not protrude to an outer circumferential-side and the size of the alternator may be reduced.

Also, a fixing means for fixing to the case is used for both the regulator and the rectifier. Since, the fixing means is used for both the regulator and the rectifier, empty space can be utilized for enlarging the heat dissipating plate of the rectifier, cooling efficiency is improved, ventilating resistance is further reduced and wind noise is lowered as well.

Moreover, the coil end does not substantially lap the fan in an axial direction and the cooling air produced by the fan ventilates an end portion of the coil end. Thus, since the structure is such that the coil ends of the automotive alternator of the present embodiment do not roughly lap the fans in an axial direction, ventilating resistance at a discharge-side is reduced, cooling characteristics are improved and wind noise is also reduced.

Further, the coil ends lap the fans in an axial direction and the cooling air produced by the fans passes through and ventilates an interior of the coil ends. Hence, the coil ends and the fans lap in an axial direction, the cooling characteristics of the stator are improved, an increase in ventilating resistance at the discharge side is prevented, cooling efficiency of the rectifier is improved and wind noise is reduced.

What is claimed is:

1. An automotive alternator comprising:

a shaft supported in a case so as to be capable of rotating;

a rotor housed in said case and comprising a plurality of magnetic poles fixed to said shaft, a field winding, and a fan fixed to at least one axial end of said magnetic poles; a stator fixed to said case so as to be positioned at an outer circumference of said rotor and comprising a core and a winding wound in said core, and provided with coil ends formed by bending back said winding at ends of said core;

a rectifier disposed in said case and comprising a rectifying element for rectifying an ac generated by said stator to a dc and a heat dissipating plate for dissipating heat generated by said rectifying element;

a regulator disposed in said case for adjusting a magnitude of the ac voltage generated by said stator;

a brush disposed in said case so as to advance and retreat in a radial direction of said rotor and one end thereof contacting said rotor to supply a field current to said field winding of said rotor;

a connector for mounting an external plug; and said case containing a plurality of intake holes at a side where said fan of said rotor is mounted, and cooling air drawn in from said intake holes is bent in a centrifugal direction after cooling said rectifier to ventilate and cool said coil ends;

wherein said regulator and said brush are disposed so as to overlap in an axial direction, and center lines of said brush, said regulator and said connector are disposed on substantially a same plane extending in a radial direction, said rectifier is disposed substantially line symmetrical to said same plane, and said plurality of intake holes are formed in said case at a position corresponding to said rectifier;

wherein said connector is disposed at substantially an outer circumferential-side of said regulator and said brush, and center lines of said connector, said regulator and said brush are disposed on substantially said same plane extending in a radial direction.

2. An automotive alternator according to claim 1 wherein:

said regulator and said brush are disposed substantially point symmetrical with said connector with said shaft as a center, and center lines of said regulator, said brush, and said connector are disposed on substantially said same plane extending in a radial direction.

3. An automotive alternator according to claim 1 wherein:

said connector is disposed so as to further overlap said regulator and said brush in an axial direction, and center lines of said regulator, said brush, and said connector are disposed on substantially said same plane extending in a radial direction.

4. An automotive alternator according to claim 1 wherein:

a fixing means for fixing to said case is used for both said regulator and said rectifier.

5. An automotive alternator according to claim 1 wherein:

said coil end does not substantially lap said fan in an axial direction and said cooling air produced by said fan ventilates an end portion of said coil end.

6. An automotive alternator according to claim 1 wherein:

said coil end substantially laps said fan in an axial direction and said cooling air produced by said fan passes through and ventilates an interior of said coil end.

* * * * *